(12) United States Patent
Gannamaneni et al.

(10) Patent No.: US 12,412,935 B2
(45) Date of Patent: Sep. 9, 2025

(54) BATTERY INCLUDING SMART BATTERY CELLS WITH FULL-BRIDGE CONFIGURED FOR CHARGE/DISCHARGE AND BYPASS STATES, AND METHOD THEREOF

(71) Applicant: Volvo Car Corporation, Gothenburg (SE)

(72) Inventors: Narendar Rao Gannamaneni, Gothenburg (SE); Jonas Forssell, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 604 days.

(21) Appl. No.: 17/663,570

(22) Filed: May 16, 2022

(65) Prior Publication Data

US 2023/0088653 A1    Mar. 23, 2023

Related U.S. Application Data

(60) Provisional application No. 63/246,410, filed on Sep. 21, 2021.

(51) Int. Cl.
| | | |
|---|---|---|
| H01M 10/42 | (2006.01) | |
| H01M 10/44 | (2006.01) | |
| H02J 7/00 | (2006.01) | |

(52) U.S. Cl.
CPC ..... *H01M 10/4257* (2013.01); *H01M 10/441* (2013.01); *H02J 7/0068* (2013.01)

(58) Field of Classification Search
CPC . H01M 10/4257; H01M 10/441; H02J 7/0068
USPC ............. 429/7, 156, 158, 50, 61; 320/122
See application file for complete search history.

(56) References Cited

U.S. PATENT DOCUMENTS

| | | | |
|---|---|---|---|
| 2015/0042283 A1 | 2/2015 | Camp et al. | |
| 2015/0044515 A1* | 2/2015 | Camp | H01M 10/425 429/61 |
| 2020/0122596 A1* | 4/2020 | Rasmussen | H01M 10/441 |

FOREIGN PATENT DOCUMENTS

EP    3 945 657 A1    2/2022

OTHER PUBLICATIONS

Chatzinikolaou et al., A comparison of grid-connected battery energy storage system designs, 2016, IEEE Transactions on Power Electronics, 32, 6913-6923 (Year: 2016).*

(Continued)

*Primary Examiner* — Sean P Cullen
(74) *Attorney, Agent, or Firm* — Amin, Turocy & Watson, LLP

(57) ABSTRACT

Systems and techniques that facilitate smartcell battery architectures and methodologies are provided. In various embodiments, a battery can comprise a positive terminal and a negative terminal. In various aspects, the battery can further comprise a set of smart battery cells that are serially coupled between the positive terminal and the negative terminal and that respectively comprise full-bridges. In various instances, the full-bridges can have charge states, discharge states, and/or by-pass states. When some of the set of smart battery cells have full-bridges in the charge state, and when others of the set of smart battery cells have full-bridges in the discharge state or by-pass state, the battery can be charged by a supplied voltage that is less than the sum of individual voltages of all of the set of smart battery cells.

20 Claims, 18 Drawing Sheets

(56) References Cited

OTHER PUBLICATIONS

Extended European Search Report received for European Patent Application Serial No. 2182288.5 dated Dec. 23, 2022, 8 pages.

* cited by examiner

BATTERY INCLUDING SMART BATTERY CELLS WITH FULL-BRIDGE CONFIGURED FOR CHARGE/DISCHARGE AND BYPASS STATES, AND METHOD THEREOF

CROSS-REFERENCE TO RELATED APPLICATIONS

This application claims priority to and the benefit of U.S. Provisional Patent Application Ser. No. 63/246,410 filed on Sep. 21, 2021, entitled "DC FAST CHARGING OF SMARTCELL EV ARCHITECTURE." The entirety of the aforementioned application is incorporated by reference herein.

TECHNICAL FIELD

The subject disclosure relates to battery architectures, and more specifically to smartcell battery architectures and methodologies.

BACKGROUND

An electric vehicle (EV) battery is often constructed from a set of battery cells that are coupled together in series. With such structure, the equivalent voltage of the EV battery is equal to the sum of the individual voltages of the set of battery cells. A charging station whose maximum suppliable voltage is greater than or equal to such equivalent voltage can charge the EV battery. However, a charging station whose maximum suppliable voltage is less than such equivalent voltage cannot charge the EV battery in the absence of a power conversion module, such as a direct-current-to-direct-current (DC-DC) booster. Unfortunately, because electric vehicles often involve voltage levels that are measured in hundreds of volts or even thousands of volts, such power conversion modules are often very large, heavy, bulky, and expensive.

Systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate smartcell battery architectures and methodologies are described.

According to one or more embodiments, a battery is provided. The battery can comprise a positive terminal and a negative terminal. In various embodiments, the battery can further comprise a set of smart battery cells. In various aspects, the set of smart battery cells can be serially coupled between the positive terminal and the negative terminal. In various instances, the set of smart battery cells can respectively comprise full-bridges. In various cases, the full-bridges can have charge states, discharge states, and/or by-pass states.

According to one or more embodiments, a battery is provided. In various aspects, the battery can comprise a set of smart battery cells. In various instances, the set of smart battery cells can respectively comprise full-bridges, where the full-bridges are independently configurable into charge states, discharge states, and by-pass states.

According to one or more embodiments, the above-described batteries can be implemented as methods of manufacture.

DETAILED DESCRIPTION

Figure 1:
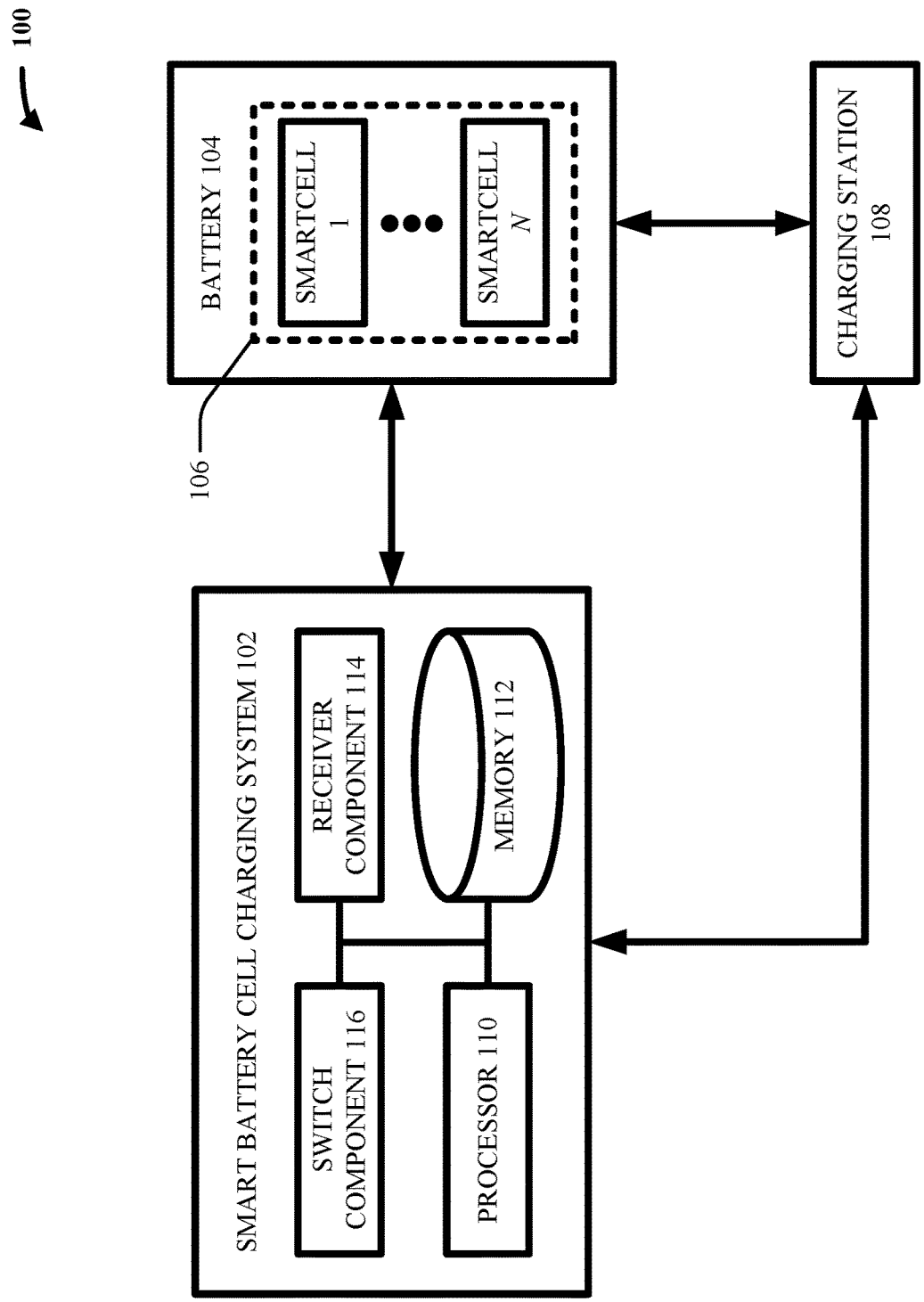
FIG. 1 illustrates a block diagram of an example, non-limiting system that facilitates smartcell battery architectures and methodologies in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

An EV battery can often be constructed from a set of battery cells that are coupled together in series. With such structure, the equivalent voltage of the EV battery is equal to the sum of the individual voltages of the set of battery cells. For example, suppose that an EV battery is constructed from two hundred battery cells that are serially coupled together, where each of such battery cells is rated at 4 volts. In such case, the EV battery can be considered as having an equivalent voltage of 800 volts (e.g., 200 cells in series multiplied by 4 volts per cell).

A charging station whose maximum suppliable voltage is greater than or equal to such equivalent voltage can charge the EV battery. For example, if the EV battery has an equivalent voltage of 800 volts, then the EV battery can be charged by a charging station that is rated at least at 800 volts. However, a charging station whose maximum suppliable voltage is less than such equivalent voltage cannot charge the EV battery in the absence of a power conversion module, such as a DC-DC booster. For example, if the EV battery has an equivalent voltage of 800 volts, then the EV battery cannot be charged by a charging station that is rated at only 400 volts, unless the charging station utilizes a power converter and/or booster to amplify its voltage.

Unfortunately, because electric vehicles often involve voltage levels that are measured in hundreds of volts or even thousands of volts, a power conversion module that is designed to work with charging stations for such electric vehicles is often very large, heavy, bulky, and/or expensive. Such size, heft, bulkiness, and/or expense can be undesirable.

Thus, systems and/or techniques that can address one or more of these technical problems can be desirable.

Various embodiments described herein can address one or more of these technical problems by facilitating smartcell battery architectures and methodologies. In particular, various embodiments described herein can be considered as an improved circuit structure and/or circuit architecture for EV battery cells, which improved circuit structure/architecture can eliminate the need for a power conversion module (e.g., can eliminate the need for a DC-DC booster). More specifically, such improved circuit structure/architecture can include outfitting and/or equipping each battery cell of an EV battery with an independently controllable full-bridge as described herein, where each independently controllable full-bridge can be configurable into a charge state, a discharge state, and/or one or more by-pass states. In various aspects, a battery cell that is outfitted/equipped with such a full-bridge can be referred to as a smartcell and/or as a smart battery cell. In any case, if an EV battery is composed of a set of smartcells, then some smartcells can be placed into charge states while other smartcells can be placed into discharge states or by-pass states, with the result being that the EV battery can be charged by a charging station whose maximum suppliable voltage is lesser than the sum of cell-wise voltages of the set of smartcells. Note that such charging can be accomplished without relying upon a DC-DC booster. Furthermore, various embodiments described herein can include a computerized tool (e.g., any suitable combination of computer-executable hardware and/or computer-executable software) that can electronically control the full-bridges of such smartcells, so as to facilitate intelligent charging of the EV battery.

In various embodiments, the computerized tool described herein can comprise a receiver component and a switch component, and such computerized tool can be electronically integrated with a battery and/or a charging station.

In various embodiments, the battery can comprise a positive terminal, a negative terminal, and/or a set of smartcells that are coupled in series with each other between the positive terminal and the negative terminal. In various aspects, the charging station can be coupled to the positive terminal and the negative terminal so as to facilitate charging of the battery (e.g., a positive electrode of the charging station can be coupled to the positive terminal of the battery, and a negative electrode of the charging station can be coupled to the negative terminal of the battery; accordingly, when the charging station is activated, electric current can flow from the positive electrode, to the positive terminal, through the set of smartcells, to the negative terminal, and finally to the negative electrode).

In various aspects, the set of smartcells can include any suitable number of smartcells. In various instances, any given smartcell can include a voltage source (e.g., a rechargeable 4-volt source, a rechargeable 8-volt source) that is coupled to and/or otherwise outfitted with a full-bridge. In various cases, the full-bridge can include a first switch, a second switch, a third switch, and a fourth switch. In various aspects, each of such four switches can be any suitable metal-oxide-semiconductor field-effect-transistor (MOSFET) that is electrically controllable (e.g., that can be opened by being exposed to some electric signal and/or that can be closed by being exposed to some other electric signal). In various aspects, the first switch and the second switch can be coupled in series with each other. Moreover, the first switch and the second switch can be collectively in parallel with the voltage source, such that the first switch is on a positive side of the voltage source, and such that the second switch is on a negative side of the voltage source. Similarly, the third switch and the fourth switch can be coupled in series with each other. Furthermore, the third switch and the fourth switch can be collectively in parallel with the voltage source, such that the third switch is on the positive side of the voltage source, and such that the fourth switch is on the negative side of the voltage source. Accordingly, the first switch and the second switch can be considered as collectively being in parallel with the third switch and the fourth switch. In various instances, the positive side of the voltage source, a free-end of the first switch, and a free-end of the third switch can all be coupled together by any suitable wiring. Likewise, the negative side of the voltage source, a free-end of the second switch, and a free-end of the fourth switch can all be coupled together with any suitable wiring.

In various cases, an input wire of the given smartcell can be coupled in between the first switch and the second switch. If the given smartcell is positioned first in the set of smartcells (e.g., if the given smartcell is not electrically separated from the positive terminal of the battery by at least one other smartcell), then the input wire can carry electric current to the given smartcell from the charging station. Instead, if the given smartcell is not positioned first in the set of smartcells (e.g., if the given smartcell is electrically separated from the positive terminal of the battery by at least one other smartcell), then the input wire can carry electric current to the given smartcell from a preceding smartcell.

Similarly, an output wire of the given smartcell can be coupled in between the third switch and the fourth switch. If the given smartcell is positioned last in the set of smartcells (e.g., if the given smartcell is not electrically separated from the negative terminal of the battery by at least one other smartcell), then the output wire can carry electric current from the given smartcell to the charging station. Instead, if the given smartcell is not positioned last in the set of smartcells (e.g., if the given smartcell is electrically separated from the negative terminal of the battery by at least one other smartcell), then the output wire can carry electric current from the given smartcell to a succeeding/following smartcell.

In various aspects, the full-bridge of the given smartcell can be configured into a charge state, a discharge state, and/or one or more by-pass states, based on whether the first switch, the second switch, the third switch, and the fourth switch are opened or closed. For example, if the first switch and the fourth switch are both closed, and if the second switch and the third switch are both open, then the full-bridge can be considered as being in a charge state. That is, in such configuration, electric current can flow: from the input wire; across the first switch (e.g., the electric current cannot flow from the input wire to the second switch since the second switch can be open); through the voltage source in a positive-to-negative direction (e.g., the electric current cannot flow from the first switch to the third switch since the third switch can be open); across the fourth switch; and to the output wire. Because the electric current can flow in a positive-to-negative direction across the voltage source, such electric current can be considered as charging and/or replenishing the voltage source.

As another example, if the second switch and the third switch are both closed, and if the first switch and the fourth switch are both open, then the full-bridge can be considered as being in a discharge state. That is, in such configuration, electric current can flow: from the input wire; across the second switch (e.g., the electric current cannot flow from the input wire to the first switch since the first switch can be open); through the voltage source in a negative-to-positive direction (e.g., the electric current cannot flow from the second switch to the fourth switch since the fourth switch can be open); across the third switch; and to the output wire. Because the electric current can flow in a negative-to-positive direction across the voltage source, such electric current can be considered as discharging and/or depleting the voltage source.

As yet another example, if the first switch and the third switch are both closed, and if the second switch and the fourth switch are both open, then the full-bridge can be considered as being in a by-pass state. That is, in such configuration, electric current can flow: from the input wire; across the first switch (e.g., the electric current cannot flow from the input wire to the second switch since the second switch can be open); across the third switch (e.g., the electric current cannot flow from the first switch to the voltage source since the fourth switch can be open); and to the output wire. Because the electric current cannot flow across the voltage source in this configuration, such electric current can be considered as by-passing the voltage source.

As even another example, if the second switch and the fourth switch are both closed, and if the first switch and the third switch are both open, then the full-bridge can be considered as being in an alternative by-pass state. That is, in such configuration, electric current can flow: from the input wire; across the second switch (e.g., the electric current cannot flow from the input wire to the first switch since the first switch can be open); across the fourth switch (e.g., the electric current cannot flow from the second switch to the voltage source since the third switch can be open); and to the output wire. Because the electric current cannot flow across the voltage source in this configuration, such electric current can be considered as by-passing the voltage source.

In various aspects, different smartcells in the set of smartcells can be placed into different states (e.g., charge states, discharge states, by-pass states). More specifically, some smartcells can be in charge states, while other smartcells can be in discharge states, and/or while still other smartcells can be in by-pass states. In this way, a total, overall, and/or equivalent voltage of the battery can be controllably manipulated as desired. For example, suppose that all of the set of smartcells are in charge states. In such case, the total, overall, and/or equivalent voltage of the battery can be equal to the sum of all of the individual cell-wise voltages of the set of smartcells. As another example, suppose that some of the set of smartcells are in charge states and that the rest of the set of smart cells are in by-pass states. In such case, the total, overall, and/or equivalent voltage of the battery can be equal to the sum of the individual cell-wise voltages of those smartcells that are in charge states. Note that such sum can be less than the sum of all of the individual cell-wise voltages of the set of smartcells. As even another example, suppose that some of the set of smartcells are in charge states, that others of the set of smart cells are in by-pass states, and that the rest of the set of smartcells are in discharge states. In such case, the total, overall, and/or equivalent voltage of the battery can be equal to the difference between: the sum of the individual cell-wise voltages of those smartcells that are in charge states; and the sum of the individual cell-wise voltages of those smartcells that are in discharge states. Note that such difference can be less than the sum of all of the individual cell-wise voltages of the set of smartcells.

Accordingly, the total, overall, and/or equivalent voltage of the battery (e.g., the total, overall, and/or equivalent voltage that is seen by the charging station) can be controllably manipulated by controlling which smartcells are in charge states, which smartcells are in discharge states, and/or which smartcells are in by-pass states. Therefore, in various cases, it can be possible for the battery to be charged by the charging station, even if the maximum suppliable voltage of the charging station is less than the sum of individual cell-wise voltages of the set of smartcells, and even in the absence of a power conversion module (e.g., even in the absence of a DC-DC booster).

In various embodiments, the receiver component of the computerized tool can electronically measure (e.g., via any suitable voltage sensors) and/or otherwise electronically identify/access (e.g., from any suitable database and/or data structure) a maximum suppliable voltage of the charging station. In some aspects, the receiver component can identify the maximum suppliable voltage by electronically communicating with the charging station itself. In any case, the maximum suppliable voltage can be a scalar that represents and/or conveys how many volts that the charging station is configured to generate (e.g., is configured to safely generate). Moreover, in various instances, the receiver component can electronically measure (e.g., via any suitable voltage sensors) and/or otherwise electronically identify/access (e.g., from any suitable databases and/or data structures) a set of cell-wise voltages that respectively correspond (e.g., in one-to-one fashion) to the set of smartcells. In various aspects, the receiver component can identify the set of cell-wise voltages by electronically communicating with the battery and/or with the set of smartcells. In any case, the set of cell-wise voltages can be a set of scalars, where each scalar can represent/convey a real-time and/or present voltage value of a respectively corresponding one of the set of smartcells.

In various embodiments, the switch component of the computerized tool can electronically generate any suitable number of charge commands, any suitable number of by-pass commands, and/or any suitable number of discharge commands, based on the maximum suppliable voltage and the set of cell-wise voltages. In various aspects, the switch component can electronically transmit such commands to the battery (e.g., to the set of smartcells). In various instances, the charge commands can cause and/or instruct respective ones of the set of smartcells to enter the charge state. In various cases, the discharge commands can cause and/or instruct respective ones of the set of smartcells to enter the discharge state. In various aspects, the by-pass commands can cause and/or instruct respective ones of the set of smartcells to enter a by-pass state. Once the set of smartcells have been configured according to the charge commands, the discharge commands, and/or the by-pass commands, the switch component can electronically instruct and/or cause the charging station to begin charging the battery.

In other words, the switch component can electronically control which smartcells of the battery are in charge states, which smartcells of the battery are in discharge states, and/or which smartcells of the battery are in by-pass states when the battery is being charged by the charging station. In some instances, this can allow the battery to be charged by the charging station, even if the maximum suppliable voltage is less than the sum of the set of cell-wise voltages.

For example, the switch component can determine whether the maximum suppliable voltage is less than the sum of the set of cell-wise voltages. If not (e.g., if the maximum suppliable voltage is greater than or equal to the sum of the set of cell-wise voltages), then the charging station can be considered as having enough voltage to charge all of the set of smartcells at once. In such case, the switch component can generate only charge commands and can refrain from generating any by-pass commands or discharge commands. That is, the switch component can cause all of the set of smartcells to be in the charge state, such that all of the set of smartcells can be charged at once by the charging station. In some other cases, however, even if the maximum suppliable voltage is greater than or equal to the sum of the set of cell-wise voltages, the switch component can generate one or more by-pass commands (e.g., can cause one or more smartcells to be in a by-pass state). Specifically, it can be possible for some smartcells to be already fully-charged, even if the charging station has enough voltage to charge all of the set of smartcells at once. Accordingly, in such case, those smartcells that are already fully-charged can be placed into a by-pass state by the switch component, and those smartcells that are less than fully-charged can be placed into the charge state by the switch component. So, when charging commences in such case, the charging station can be considered as charging those smartcells that are in the charge state and as leaving untouched those smartcells that are in the by-pass state.

On the other hand, if the maximum suppliable voltage is less than the sum of the set of cell-wise voltages, then the charging station can be considered as not having enough voltage to charge all of the set of smartcells at once. In such case, the switch component can generate any suitable number of charge commands, any suitable number of by-pass commands, and/or any suitable number of discharge commands, so that some of the smartcells can be in charge states, some of the smartcells can be in by-pass states, and/or some of the smartcells can be in discharge states. More specifically, the switch component can generate such commands so as to ensure that the maximum suppliable voltage is greater than or equal to the difference between: the sum of the cell-wise voltages of those smartcells that are in charge states; and the sum of cell-wise voltages of those smartcells that are in discharge states. Accordingly, when charging commences in such case, the charging station can be considered as charging those smartcells that are in the charge state, as discharging those smartcells that are in the discharge state, and as leaving untouched those smartcells that are in by-pass states.

Note that, because of the herein-described smartcell battery architecture, the charging station can charge the battery without utilizing/relying upon a DC-DC booster, even when the maximum suppliable voltage is less than the sum of the set of cell-wise voltages.

Various embodiments described herein can be employed to use hardware and/or software to solve problems that are highly technical in nature (e.g., to facilitate smartcell battery architectures and methodologies), that are not abstract, that are not mere laws of nature, that are not mere natural phenomena, and that cannot be performed as a set of mental acts by a human. Instead, various embodiments described herein include tangible electric circuit structures/architectures and/or methodologies pertaining to such tangible electric circuit structures/architectures that can be implemented so as to allow a low-voltage charging station to charge a high-voltage set of battery cells without requiring a DC-DC booster. Indeed, as mentioned above, an EV battery can often be constructed from a set of battery cells coupled in series with each other. With such construction, the EV battery cannot be charged by a charging station whose maximum suppliable voltage is less than the sum of the individual cell-wise voltages of the set of battery cells, unless the charging station utilizes a DC-DC booster.

In contrast, various embodiments described herein can address one or more of such technical problems. Specifically, systems/techniques described herein can include equipping/outfitting each of a set of battery cells with a respective, independently-controllable full-bridge, where such full-bridge can be configurable (e.g., in response to electric drive signals) into a charge state, a discharge state, and/or one or more by-pass states. Accordingly, the full-bridges of some of such set of battery cells can be configured into charge states, while the full-bridges of others of such set of battery cells can be configured into discharge states, and/or while the full-bridges of still others of such set of battery cells can be configured into by-pass states. In such case, the total/equivalent voltage of the set of battery cells can be less than the sum of all of the individual cell-wise voltages of the set of battery cells. In particular, in such case, the total/equivalent voltage of the set of battery cells can be equal to the sum of the individual cell-wise voltages of those battery cells whose full-bridges are configured to charge states, minus the sum of the individual cell-wise voltages of those battery cells whose full-bridges are configured to discharge states. Therefore, such set of battery cells can be charged by a charging station whose maximum suppliable voltage is less than the sum of individual cell-wise voltages of all of the set of battery cells, without relying upon a DC-DC booster. Various other embodiments described herein pertain to a computerized tool that can electronically control the full-bridges of such battery cells, so as to facilitate intelligent charging of a smartcell battery architecture. Because various embodiments described herein can eliminate the need for a DC-DC booster, such embodiments certainly constitute a concrete and tangible technical improvement in the field of battery architectures.

Furthermore, various embodiments described herein can control tangible, hardware-based, and/or software-based devices based on the disclosed teachings. For example, embodiments described herein can include tangible battery cells that are outfitted/equipped with tangible full-bridges. As explained herein, when a tangible battery cell is outfitted/equipped with a tangible full-bridge, the individual switches of such tangible full-bridge can be controllably opened and/or closed so as to cause an electric current to replenish, deplete, and/or by-pass a voltage source of the tangible battery cell.

It should be appreciated that the figures and the herein disclosure describe non-limiting examples of various embodiments. It should further be appreciated that the figures are not necessarily drawn to scale.

FIG. 1 illustrates a block diagram of an example, non-limiting system 100 that can facilitate smartcell battery architectures and methodologies in accordance with one or more embodiments described herein. As shown, a smart battery cell charging system 102 can be electronically integrated, via any suitable wired and/or wireless electronic connections, with a battery 104 and/or with a charging station 108.

In various embodiments, the battery 104 can be any suitable type of electric battery that includes a set of smartcells 106. In various aspects, as shown, the set of smartcells 106 can include n smartcells for any suitable positive integer n: a smartcell 1 to a smartcell n. In various instances, the set of smartcells 106 can all be coupled together in series with each other. Furthermore, in various cases, each of the set of smartcells 106 can include an independent voltage source that is outfitted/equipped with an independently controllable full-bridge. As described herein, an independently controllable full-bridge can be controllably configured into a charge state (e.g., so as to replenish a voltage source of a respective smartcell), a discharge state (e.g., so as to diminish a voltage source of a respective smartcell), and/or one or more by-pass states (e.g., so as to leave untouched a voltage source of a respective smartcell). In various aspects, the battery 104 can include a positive terminal and a negative terminal (not shown in FIG. 1), where the set of smartcells 106 can be coupled together in series between the positive terminal and the negative terminal.

In various embodiments, the charging station 108 can be any suitable type of electric charger whose electrodes can physically contact and/or be coupled to the positive terminal and the negative terminal of the battery 104. For example, in some instances, the charging station 108 can have a positive electrode and a negative electrode (not shown), where the positive electrode can be physically in contact with the positive terminal of the battery 104, and where the negative electrode can be physically in contact with the negative terminal of the battery 104. Accordingly, when the charging station 108 is activated, electric current can flow from the positive electrode of the charging station 108, to the positive terminal of the battery 104, through the set of smartcells 106, to the negative terminal of the battery 104, and finally to the negative electrode of the charging station 108.

In various embodiments, it can be possible for the charging station 108 to not be able to produce sufficient voltage to charge all of the set of smartcells 106 at once. In such case, it can be desirable to nevertheless allow the charging station 108 to charge the battery 104, without requiring/utilizing a DC-DC booster. As described herein, the smart battery cell charging system 102 can facilitate such charging.

In various embodiments, the smart battery cell charging system 102 can comprise a processor 110 (e.g., computer processing unit, microprocessor) and a computer-readable memory 112 that is operably/operatively connected/coupled to the processor 110. The memory 112 can store computer-executable instructions which, upon execution by the processor 110, can cause the processor 110 and/or other components of the smart battery cell charging system 102 (e.g., receiver component 114, switch component 116) to perform one or more acts. In various embodiments, the memory 112 can store computer-executable components (e.g., receiver component 114, switch component 116), and the processor 110 can execute the computer-executable components.

In various embodiments, the smart battery cell charging system 102 can comprise a receiver component 114. In various aspects, as described herein, the receiver component 114 can electronically measure, identify, and/or access a maximum suppliable voltage of the charging station 108. In various instances, as described herein, the receiver component 114 can further electronically measure, identify, and/or access a set of cell-wise voltages that respectively correspond to the set of smartcells 106.

In various embodiments, the smart battery cell charging system 102 can further comprise a switch component 116. In various aspects, as described herein, the switch component 116 can, based on the maximum suppliable voltage and/or the set of cell-wise voltages, electronically generate charge commands, discharge commands, and/or by-pass commands, which can cause/instruct respective ones of the set of smartcells 106 to be configured into charge states, discharge states, and/or by-pass states. Further still, in various instances, the switch component 116 can cause/instruct the charging station 108 to activate, after the set of smartcells 106 are configured according to the charge commands, the discharge commands, and/or the by-pass commands. In such case, the charging station 108 can be considered as charging those of the set of smartcells 106 that are configured into charge states, as discharging those of the set of smartcells 106 that are configured into discharge states, and/or as by-passing those of the set of smartcells 106 that are configured into by-pass states.

Figure 2:
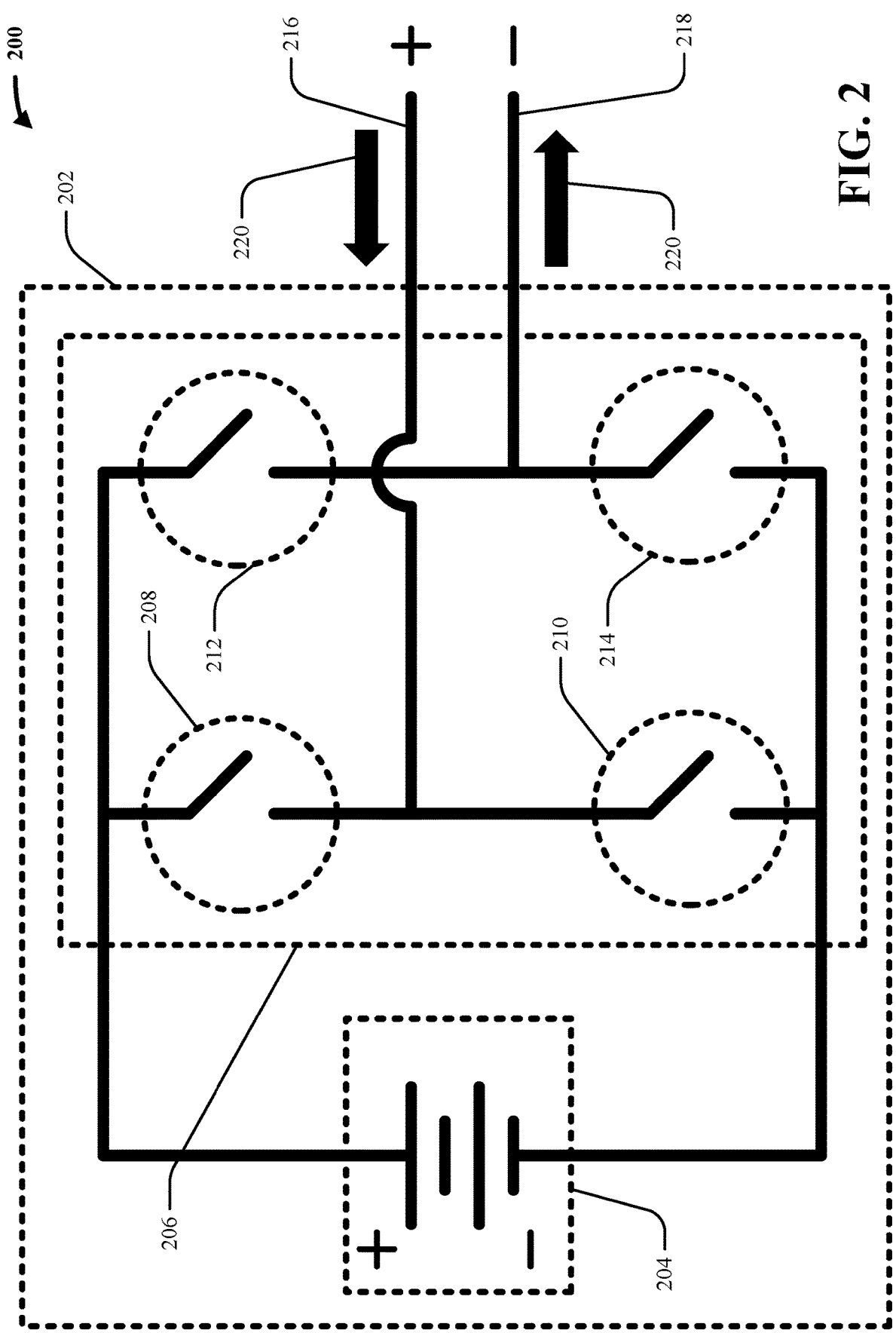
FIG. 2 illustrates a circuit diagram of an example, non-limiting battery cell that exhibits a smartcell architecture involving a full-bridge in accordance with one or more embodiments described herein.
Figure 3:
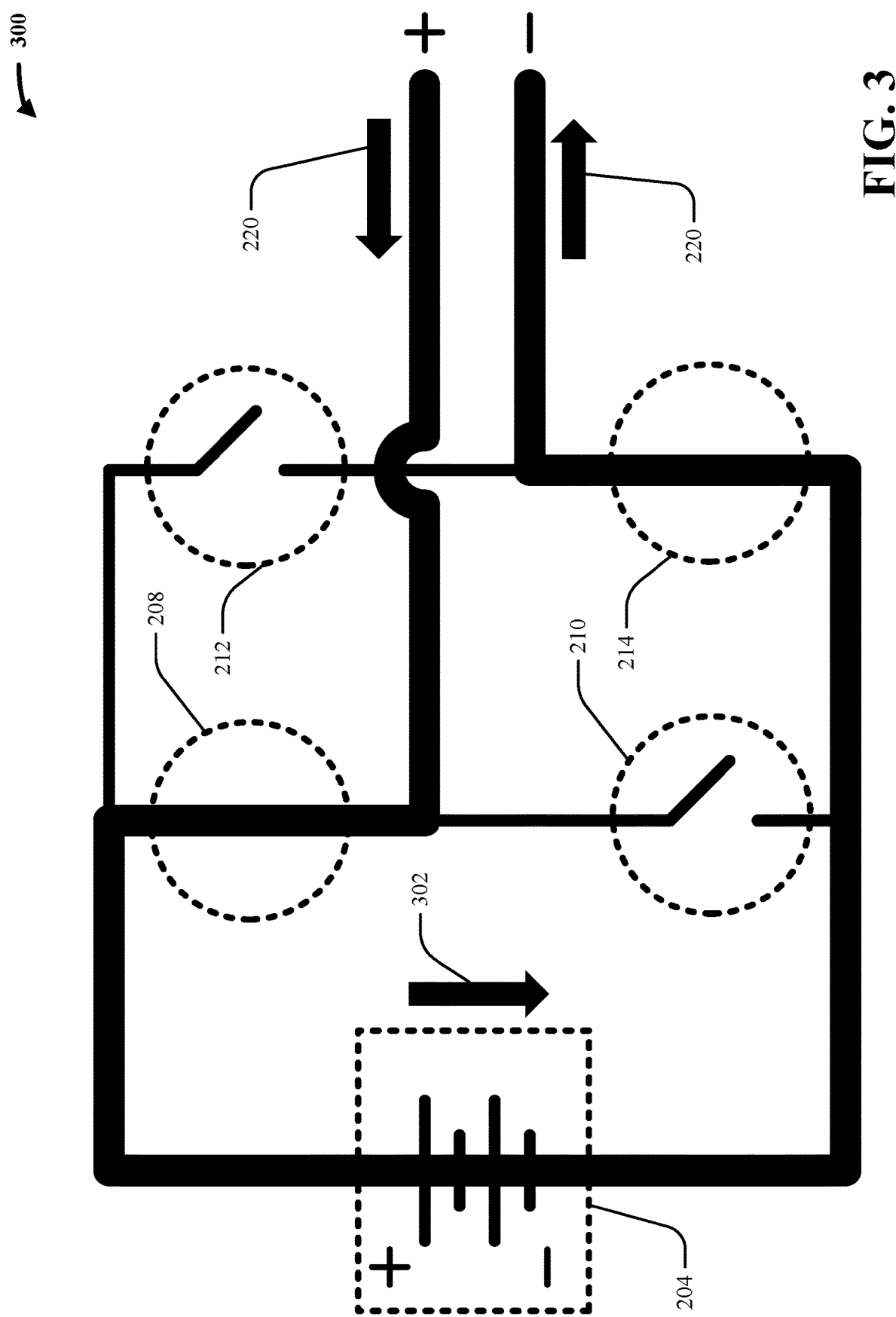
FIG. 3 illustrates a circuit diagram of an example, non-limiting battery cell that exhibits a smartcell architecture involving a full-bridge configured to a charge state in accordance with one or more embodiments described herein.
Figure 4:
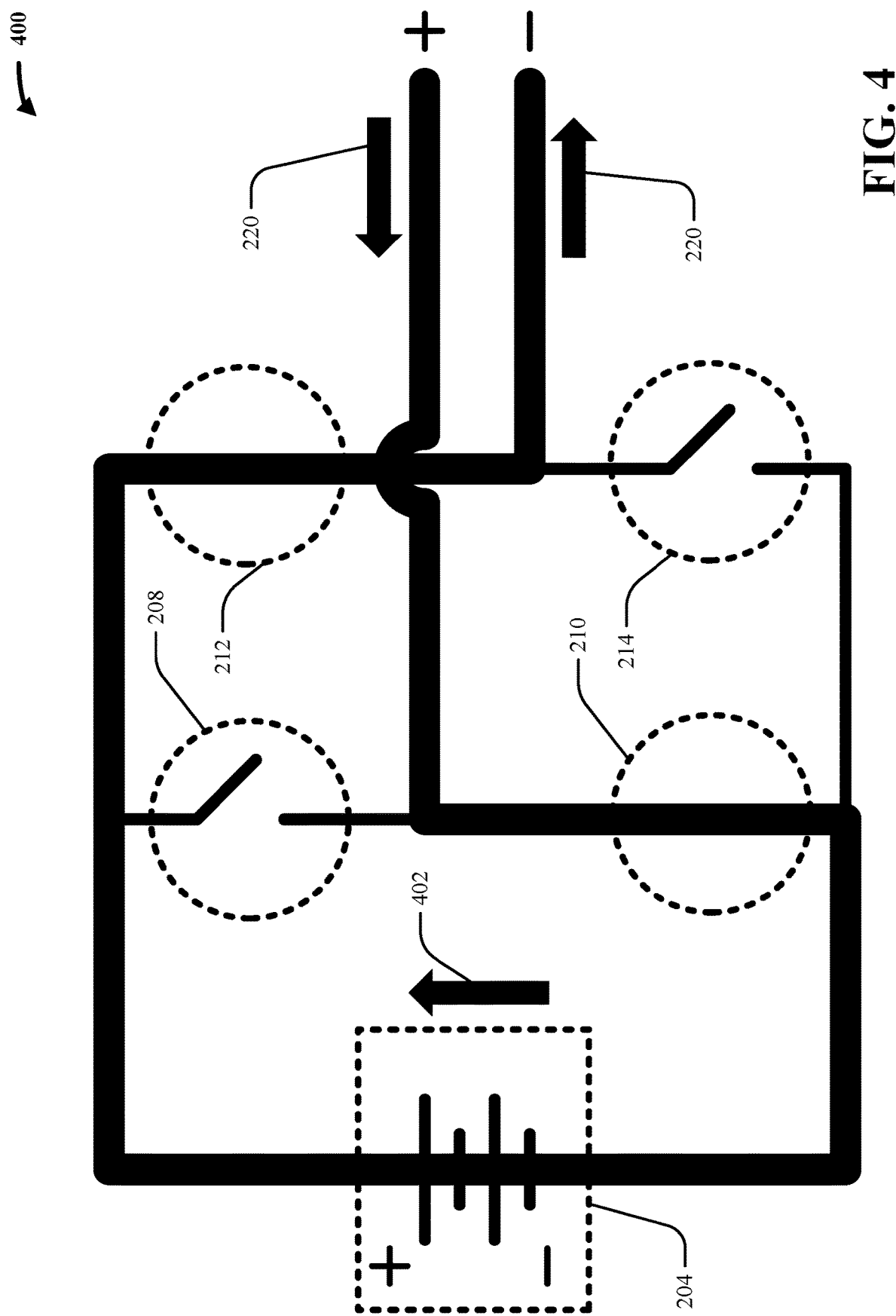
FIG. 4 illustrates a circuit diagram of an example, non-limiting battery cell that exhibits a smartcell architecture involving a full-bridge configured to a discharge state in accordance with one or more embodiments described herein.
Figure 5:
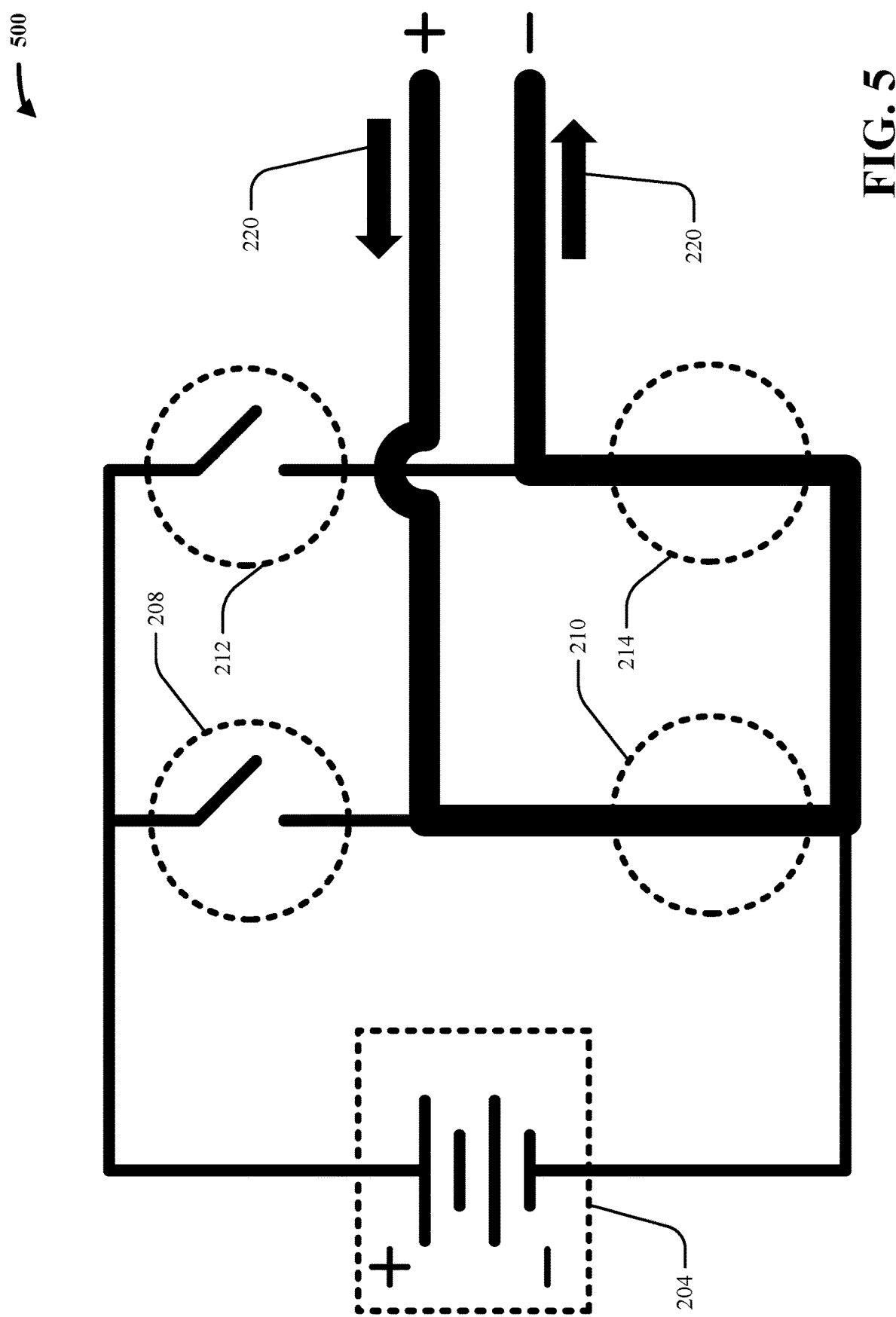
FIG. 5 illustrates a circuit diagram of an example, non-limiting battery cell that exhibits a smartcell architecture involving a full-bridge configured to a by-pass state in accordance with one or more embodiments described herein.
Figure 6:
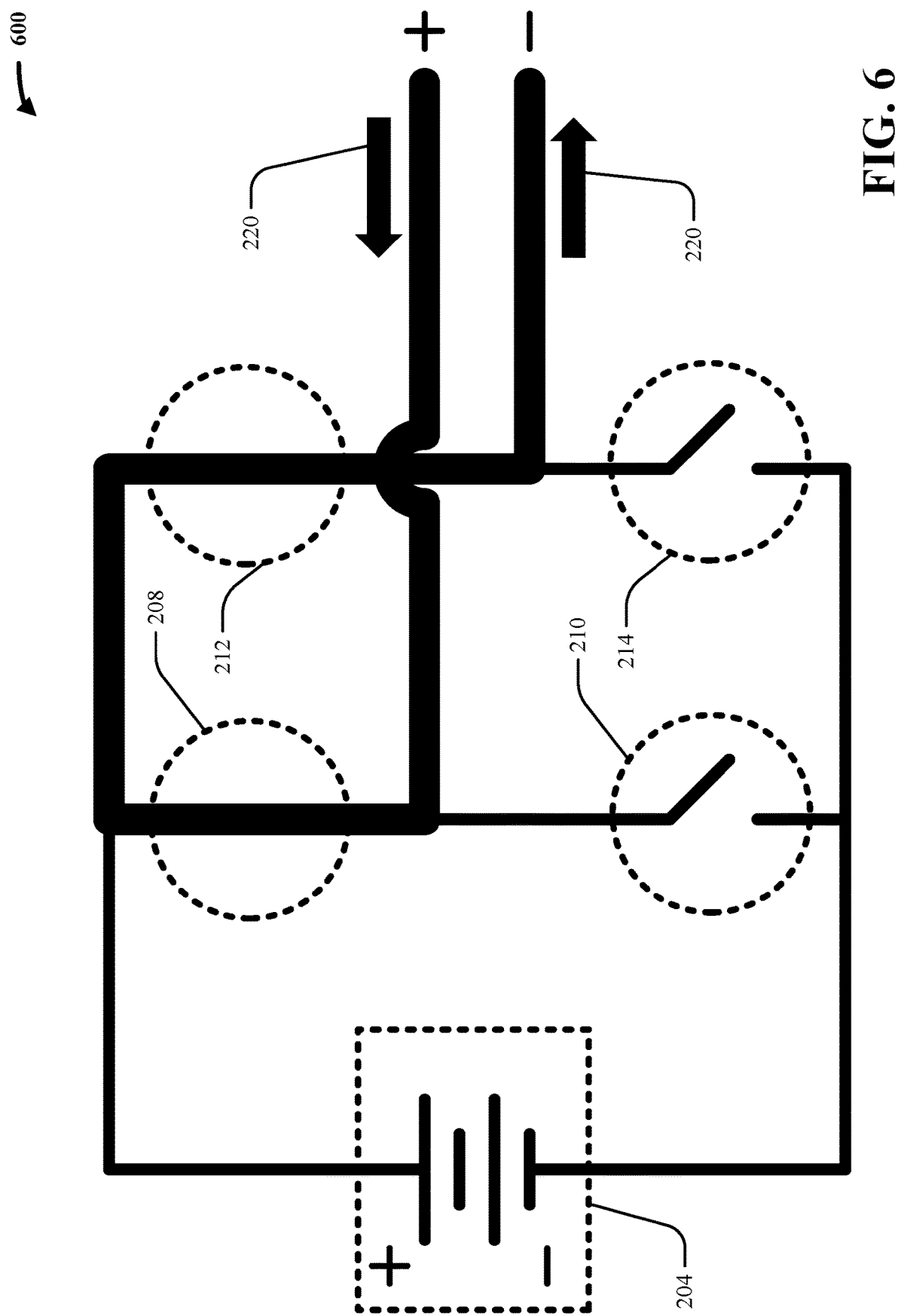
FIG. 6 illustrates a circuit diagram of an example, non-limiting battery cell that exhibits a smartcell architecture involving a full-bridge configured to an alternative by-pass state in accordance with one or more embodiments described herein.

To further understand the physical construction of one of the set of smartcells 106, consider FIGS. 2-6, where FIG. 2 illustrates a non-limiting example of a smartcell, where FIG. 3 illustrates a non-limiting example of a charge state of a smartcell, where FIG. 4 illustrates a non-limiting example of a discharge state of a smartcell, and where FIGS. 5-6 illustrate non-limiting examples of by-pass states of a smartcell.

FIG. 2 illustrates a circuit diagram 200 of an example, non-limiting battery cell that exhibits a smartcell architecture involving a full-bridge in accordance with one or more embodiments described herein. In other words, FIG. 2 depicts a non-limiting example of any one of the set of smartcells 106.

In various embodiments, there can be a smartcell 202. In various aspects, the smartcell 202 can be any one of the set of smartcells 106. In various instances, as shown, the smartcell 202 can include a voltage source 204. In various cases, the voltage source 204 can exhibit any suitable construction and/or any suitable voltage value as desired. For example, the voltage source 204 can, in some instances, be a rechargeable 4-volt source. As another example, the voltage source 204 can, in various aspects, be a rechargeable 8-volt source. In any case, the voltage source 204 can be considered as having a positive side and a negative side. As shown in FIG. 2, the positive side of the voltage source 204 can be denoted and/or called out by a plus-sign, and the negative side of the voltage source 204 can be denoted and/or called out by a minus-sign.

In various aspects, as shown, the smartcell 202 can further include a full-bridge 206 that can be coupled to the voltage source 204. In various instances, as shown, the full-bridge 206 can include four electrically controllable switches: a switch 208, a switch 210, a switch 212, and/or a switch 214. In various cases, the switch 208 can be any suitable type of MOSFET as desired. That is, the switch 208 can be any suitable type of electrically openable and/or electrically closable switch (e.g., a switch that can open in response to being driven by or exposed to some electric signal and/or that can close in response to being driven by or exposed to some other electric signal). For ease of illustration (e.g., for sake of visual clarity and/or to reduce visual clutter), a driveline of the switch 208 is not depicted in FIG. 2. Those having ordinary skill in the art will nevertheless appreciate that a driveline cable/wire can be coupled to the switch 208, where an electric signal carried by such driveline cable/wire can control the switch 208 (e.g., can cause the switch 208 to open or to close).

Likewise, in various aspects, the switch 210 can be any suitable type of MOSFET. That is, the switch 210 can be any suitable type of electrically openable and/or electrically closable switch (e.g., a switch that can open in response to being driven by or exposed to some electric signal and/or that can close in response to being driven by or exposed to some other electric signal). Just as above, a driveline of the switch 210 is not depicted in FIG. 2 for sake of visual clarity and/or ease of illustration. Those having ordinary skill in the art will nevertheless appreciate that a driveline cable/wire can be coupled to the switch 210, where an electric signal carried by such driveline cable/wire can control the switch 210 (e.g., can cause the switch 210 to open or to close).

Similarly, in various instances, the switch 212 can be any suitable type of MOSFET. In other words, the switch 212 can be any suitable type of electrically openable and/or electrically closable switch (e.g., a switch that can open in response to being driven by or exposed to some electric signal and/or that can close in response to being driven by or exposed to some other electric signal). Just as above, a driveline of the switch 212 is not depicted in FIG. 2 for sake of visual clarity and/or ease of illustration. Those having ordinary skill in the art will nevertheless appreciate that a driveline cable/wire can be coupled to the switch 212, where an electric signal carried by such driveline cable/wire can control the switch 212 (e.g., can cause the switch 212 to open or to close).

Furthermore, in various cases, the switch 214 can be any suitable type of MOSFET. That is, the switch 214 can be any suitable type of electrically openable and/or electrically closable switch (e.g., a switch that can open in response to being driven by or exposed to some electric signal and/or that can close in response to being driven by or exposed to some other electric signal). Again, a driveline of the switch 214 is not depicted in FIG. 2 for sake of visual clarity and/or ease of illustration. Those having ordinary skill in the art will nevertheless appreciate that a driveline cable/wire can be coupled to the switch 214, where an electric signal carried by such driveline cable/wire can control the switch 214 (e.g., can cause the switch 214 to open or to close).

In various aspects, as shown, the switch 208 and the switch 210 can be coupled to each other in series. Moreover, as shown, the switch 208 and the switch 210 can be considered as collectively being in parallel with the voltage source 204, where the switch 208 can be on the positive side of the voltage source 204, and/or where the switch 210 can be on the negative side of the voltage source 204. Similarly, as shown, the switch 212 and the switch 214 can be coupled to each other in series. Furthermore, as shown, the switch 212 and the switch 214 can be considered as collectively being in parallel with the voltage source 204, where the switch 212 can be on the positive side of the voltage source 204, and/or where the switch 214 can be on the negative side of the voltage source 204.

In various aspects, as shown, the positive side of the voltage source 204 can be coupled to both the switch 208 and the switch 212. Similarly, as shown, the negative side of the voltage source 204 can be coupled to both the switch 210 and the switch 214.

In various instances, as shown, there can be an input line 216 and/or an output line 218. In various cases, the input line 216 can be any suitable cable and/or wire, and the input line 216 can be coupled in between (e.g., to a midpoint between) the switch 208 and the switch 210. Likewise, as shown, the output line 218 can be any suitable cable and/or wire, and the output line 218 can be coupled in between (e.g., to a midpoint between) the switch 212 and the switch 214. In various aspects, the input line 216 can carry an electric current 220 into the smartcell 202, whereas the output line 218 can carry the electric current 220 out of the smartcell 202. As those having ordinary skill in the art will appreciate, the electric current 220 can be a direct current having any suitable amperage level as desired.

If the smartcell 202 is the first smartcell in the set of smartcells 106 (e.g., if there is not at least one other smartcell that is in series between the smartcell 202 and the positive terminal of the battery 104), then the electric current 220 can flow to the input line 216 from the charging station 108. On the other hand, if the smartcell 202 is not the first smartcell in the set of smartcells 106 (e.g., if there is at least one other smartcell that is in series between the smartcell 202 and the positive terminal of the battery 104), then the electric current 220 can flow to the input line 216 from a preceding smartcell in the set of smartcells 106. Likewise, if the smartcell 202 is the last smartcell in the set of smartcells 106 (e.g., if there is not at least one other smartcell that is in series between the smartcell 202 and the negative terminal of the battery 104), then the electric current 220 can flow from the output line 218 to the charging station 108. On the other hand, if the smartcell 202 is not the last smartcell in the set of smartcells 106 (e.g., if there is at least one other smartcell that is in series between the smartcell 202 and the negative terminal of the battery 104), then the electric current 220 can flow from the output line 218 to a succeeding/following smartcell in the set of smartcells 106.

In various aspects, the full-bridge 206 can cause the electric current 220 to either charge, discharge, and/or by-pass the voltage source 204. This is explained in more detail with respect to FIGS. 3-6.

FIG. 3 illustrates a circuit diagram 300 of an example, non-limiting battery cell that exhibits a smartcell architecture involving a full-bridge configured to a charge state in accordance with one or more embodiments described herein. In other words, FIG. 3 depicts the smartcell 202 when the full-bridge 206 is configured into a charge state.

In various embodiments, as shown, the full-bridge 206 of the smartcell 202 can be configured into the charge state when: the switch 208 is closed; the switch 210 is open; the switch 212 is open; and the switch 214 is closed. In such configuration, the electric current 220 can flow from the input line 216 and across the switch 208. Note that the electric current 220 cannot flow from the input line 216 across the switch 210, since the switch 210 can be open. After flowing across the switch 208, the electric current 220 can flow across the voltage source 204 in a positive-to-negative direction as indicated by the numeral 302. Note that the electric current 220 cannot flow from the switch 208 across the switch 212, since the switch 212 can be open. After flowing across the voltage source 204 in the positive-to-negative direction, the electric current 220 can flow across the switch 214 to the output line 218. Note that the electric current 220 cannot flow from the voltage source 204 across the switch 210, since the switch 210 can be open. Because the electric current 220 in this configuration can flow across the voltage source 204 in the positive-to-negative direction (e.g., as indicated by the numeral 302), the electric current 220 can be considered as charging and/or replenishing the voltage source 204 in this configuration, hence the term "charge state."

FIG. 4 illustrates a circuit diagram 400 of an example, non-limiting battery cell that exhibits a smartcell architecture involving a full-bridge configured to a discharge state in accordance with one or more embodiments described herein. In other words, FIG. 4 depicts the smartcell 202 when the full-bridge 206 is configured into a discharge state.

In various embodiments, as shown, the full-bridge 206 of the smartcell 202 can be configured into the discharge state when: the switch 208 is open; the switch 210 is closed; the switch 212 is closed; and the switch 214 is open. In such configuration, the electric current 220 can flow from the input line 216 and across the switch 210. Note that the electric current 220 cannot flow from the input line 216 across the switch 208, since the switch 208 can be open. After flowing across the switch 210, the electric current 220 can flow across the voltage source 204 in a negative-to-positive direction as indicated by the numeral 402. Note that the electric current 220 cannot flow from the switch 210 across the switch 214, since the switch 214 can be open. After flowing across the voltage source 204 in the negative-to-positive direction, the electric current 220 can flow across the switch 212 to the output line 218. Note that the electric current 220 cannot flow from the voltage source 204 across the switch 208, since the switch 208 can be open. Because the electric current 220 in this configuration can flow across the voltage source 204 in the negative-to-positive direction (e.g., as indicated by the numeral 402), the electric current 220 can be considered as discharging and/or depleting the voltage source 204 in this configuration, hence the term "discharge state."

FIG. 5 illustrates a circuit diagram 500 of an example, non-limiting battery cell that exhibits a smartcell architecture involving a full-bridge configured to a by-pass state in accordance with one or more embodiments described herein. In other words, FIG. 5 depicts the smartcell 202 when the full-bridge 206 is configured into a by-pass state.

In various embodiments, as shown, the full-bridge 206 of the smartcell 202 can be configured into the by-pass state when: the switch 208 is open; the switch 210 is closed; the switch 212 is open; and the switch 214 is closed. In such configuration, the electric current 220 can flow from the input line 216 and across the switch 210. Note that the electric current 220 cannot flow from the input line 216 across the switch 208, since the switch 208 can be open. After flowing across the switch 210, the electric current 220 can flow across the switch 214 to the output line 218. Note that the electric current 220 cannot flow from the switch 210 across the voltage source 204, since both the switch 208 and the switch 212 can be open. Because the electric current 220 can refrain from flowing across the voltage source 204, the electric current 220 can be considered as by-passing the voltage source 204 in this configuration, hence the term "by-pass state."

FIG. 6 illustrates a circuit diagram 600 of an example, non-limiting battery cell that exhibits a smartcell architecture involving a full-bridge configured to an alternative by-pass state in accordance with one or more embodiments described herein. In other words, FIG. 6 depicts the smartcell 202 when the full-bridge 206 is configured into an alternative by-pass state.

In various embodiments, as shown, the full-bridge 206 of the smartcell 202 can be configured into the alternative by-pass state when: the switch 208 is closed; the switch 210 is open; the switch 212 is closed; and the switch 214 is open. In such configuration, the electric current 220 can flow from the input line 216 and across the switch 208. Note that the electric current 220 cannot flow from the input line 216 across the switch 210, since the switch 210 can be open. After flowing across the switch 208, the electric current 220 can flow across the switch 212 to the output line 218. Note that the electric current 220 cannot flow from the switch 208 across the voltage source 204, since both the switch 210 and the switch 214 can be open. Because the electric current 220 can refrain from flowing across the voltage source 204, the electric current 220 can be considered as by-passing the voltage source 204 in this configuration, hence the term "by-pass state."

FIGS. 2-6, described above, help to explain the structure and the various states of a single one of the set of smartcells 106. In various aspects, FIGS. 7-11 can help to explain how the entire set of smartcells 106 can interact with each other in such various states.

Figure 7:
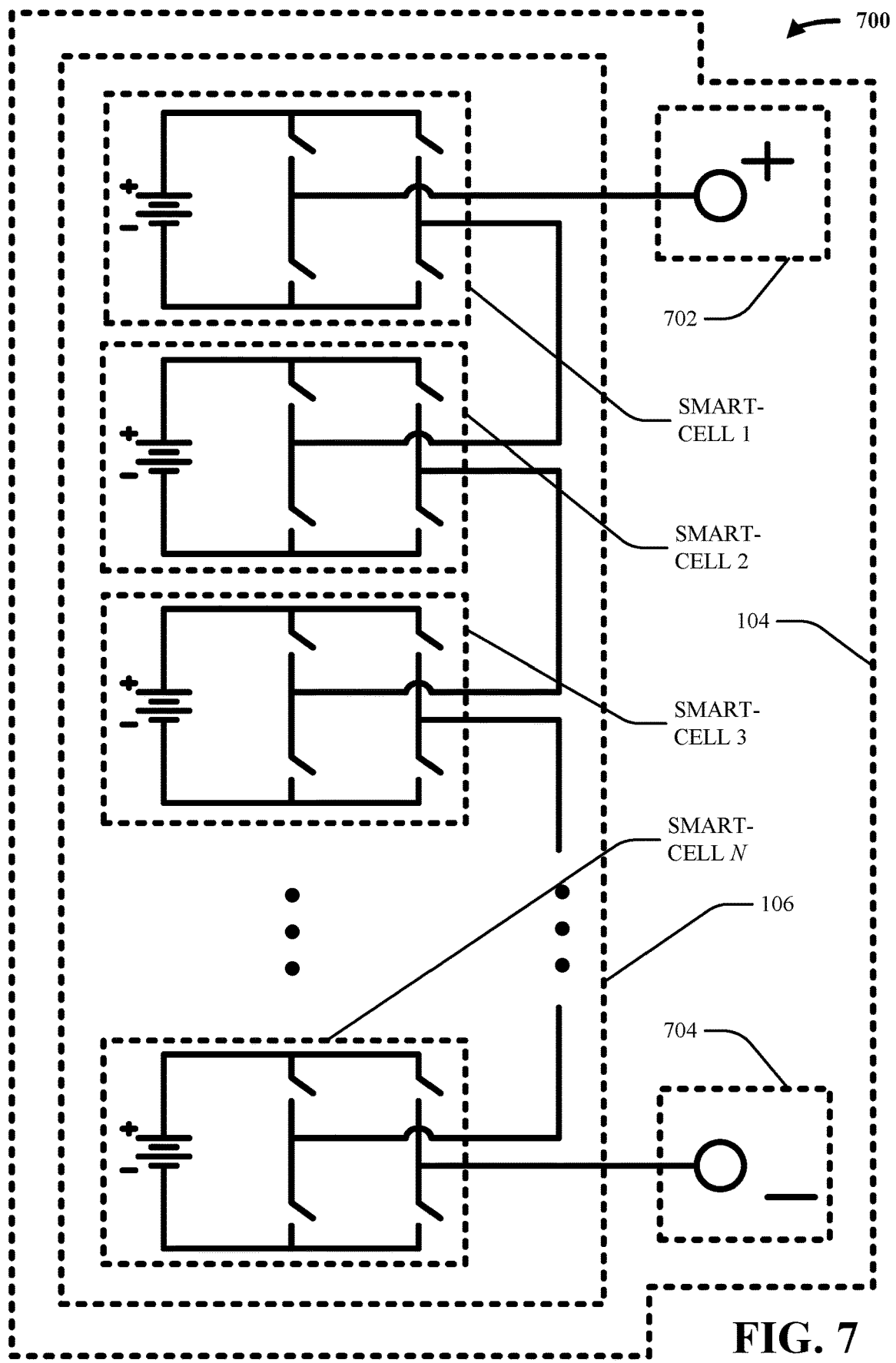
FIG. 7 illustrates a circuit diagram of an example, non-limiting battery that includes a set of battery cells which exhibit smartcell architectures in accordance with one or more embodiments described herein.

FIG. 7 illustrates a circuit diagram 700 of an example, non-limiting battery that includes a set of battery cells which exhibit smartcell architectures in accordance with one or more embodiments described herein. In other words, FIG. 7 depicts a non-limiting, example embodiment of the battery 104.

In various embodiments, as shown, the battery 104 can include a positive terminal 702 and/or a negative terminal 704. Furthermore, as shown, the battery 104 can include the set of smartcells 106, where the set of smartcells 106 can be coupled in series with each other in between the positive terminal 702 and the negative terminal 704. For ease of illustration, FIG. 7 depicts the smartcell 1, a smartcell 2, a smartcell 3, and the smartcell n. As shown in FIG. 7, each of the set of smartcells 106 can have the structure shown in FIG. 2; that is, each of the set of smartcells 106 can have a voltage source and an independently controllable full-bridge that is configurable into a charge state, a discharge state, and/or one or more by-pass states. As also shown in FIG. 7, an input line of any given smartcell can come from either the positive terminal 702 or the output line of a preceding smartcell, and an output line of any given smartcell can lead to either the negative terminal 704 or to the input line of a succeeding/following smartcell. For example, the input line of the smartcell 1 can come from the positive terminal 702, the output line of the smartcell 1 can lead to the input line of the smartcell 2, the output line of the smartcell 2 can lead to the input line of the smartcell 3, and/or the output line of the smartcell n can lead to the negative terminal 704.

In various cases, any suitable number of the set of smartcells 106 can be configured into the charge state, any suitable number of the set of smartcells 106 can be configured into the discharge state, and/or any suitable number of the set of smartcells 106 can be configured into by-pass states. This can allow the overall, total, and/or equivalent voltage of the battery 104 to be controllably modified. This is further explained with respect to FIGS. 8-11.

Figure 8:
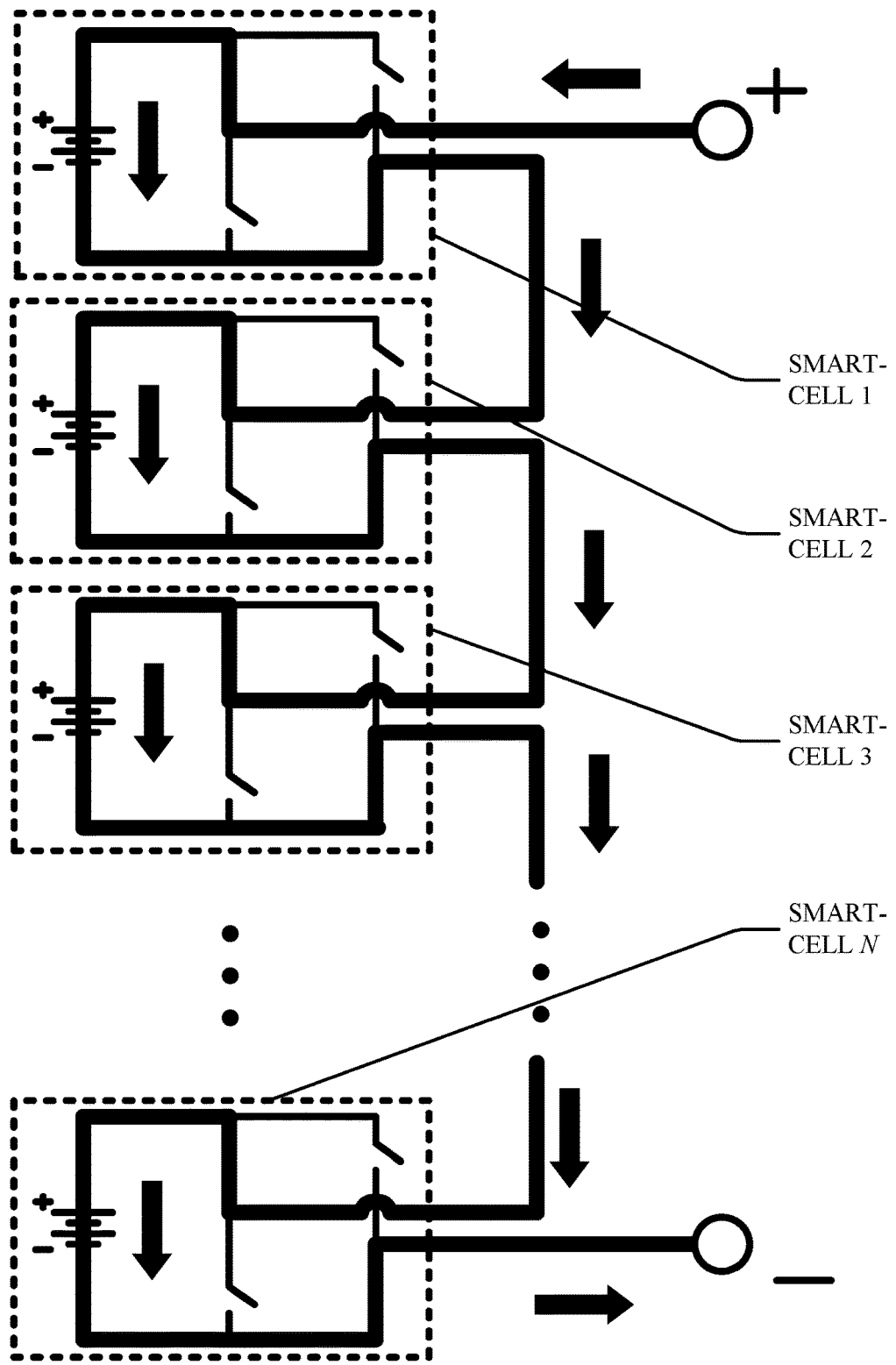
FIG. 8 illustrates a circuit diagram of an example, non-limiting battery that includes a set of battery cells which exhibit smartcell architectures, where all of such battery cells are configured to charge states, in accordance with one or more embodiments described herein.

FIG. 8 illustrates a circuit diagram 800 of an example, non-limiting battery that includes a set of battery cells which exhibit smartcell architectures, where all of such battery cells are configured to charge states, in accordance with one or more embodiments described herein. In other words, FIG. 8 depicts a non-limiting, example embodiment of the battery 104, when each of the set of smartcells 106 is placed in the charge state.

As shown, when each of the set of smartcells 106 is placed and/or configured into the charge state, electric current can, as indicated by the bolded arrows of FIG. 8, flow: from the positive terminal 702; to an input line of the smartcell 1; across the voltage source of the smartcell 1 in a positive-to-negative direction, thereby charging/replenishing the smartcell 1; to the output line of the smartcell 1; to the input line of the smartcell 2; across the voltage source of the smartcell 2 in a positive-to-negative direction, thereby charging/replenishing the smartcell 2; to the output line of the smartcell 2; to the input line of the smartcell 3; across the voltage source of the smartcell 3 in a positive-to-negative direction, thereby charging/replenishing the smartcell 3; to the output line of the smartcell 3; . . . ; to the input line of the smartcell n; across the voltage source of the smartcell n in a positive-to-negative direction, thereby charging/replenishing the smartcell n; to the output line of the smartcell n; and finally to the negative terminal 704. In such configuration, the total, overall, and/or equivalent voltage of the battery 104 can be equal to the sum of all of the individual cell-wise voltages of the set of smartcells 106.

Figure 9:
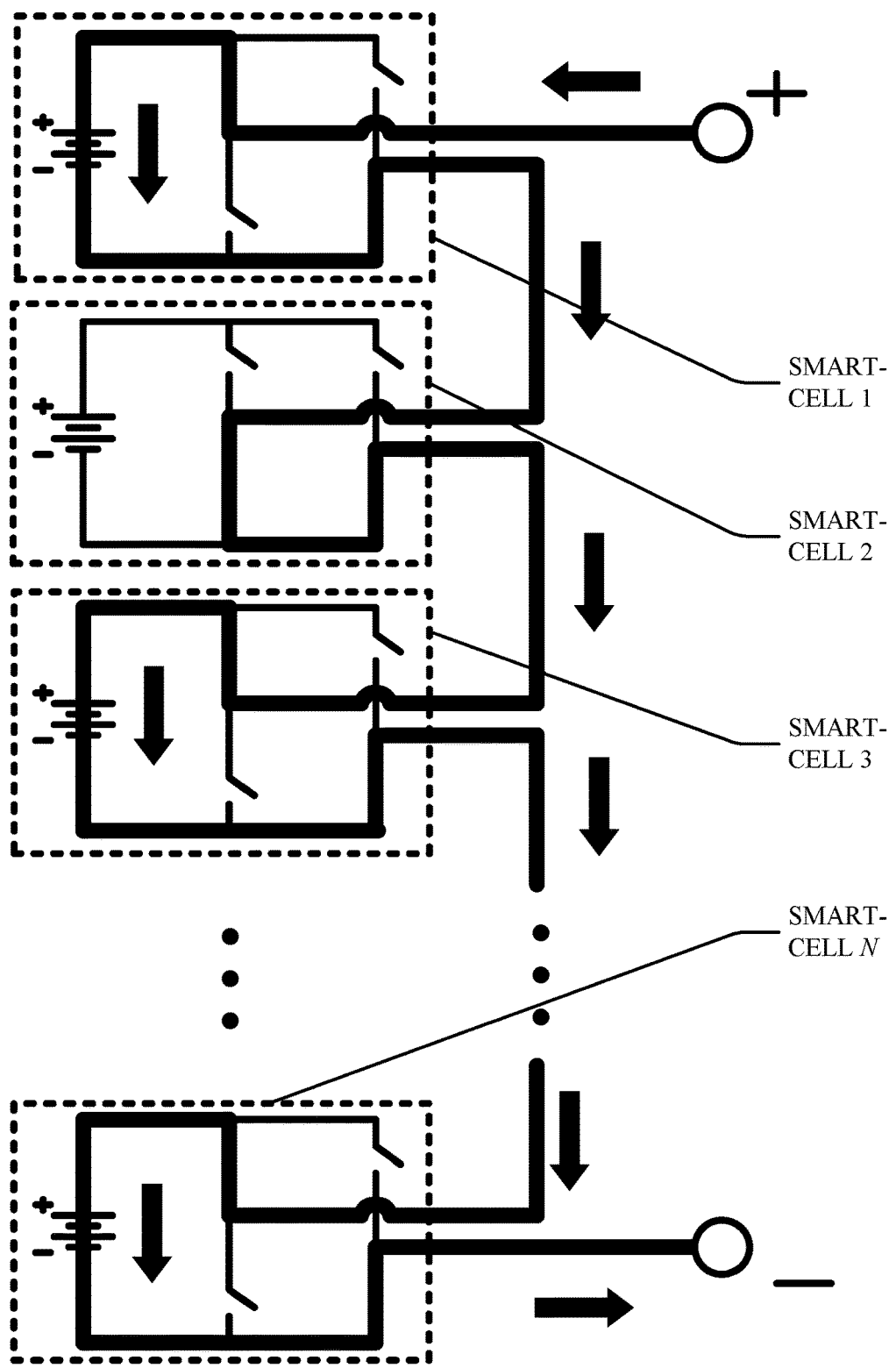
FIG. 9 illustrates a circuit diagram of an example, non-limiting battery that includes a set of battery cells which exhibit smartcell architectures, where one or more of such battery cells is configured to a by-pass state, and where the remainder of such battery cells are configured to charge states, in accordance with one or more embodiments described herein.

FIG. 9 illustrates a circuit diagram 900 of an example, non-limiting battery that includes a set of battery cells which exhibit smartcell architectures, where one or more of such battery cells is configured to a by-pass state, and where the remainder of such battery cells are configured to charge states, in accordance with one or more embodiments described herein.

Without loss of generality, suppose that the smartcell 2 is placed into a by-pass state. As shown, when each of the set of smartcells 106, except the smartcell 2, is placed and/or configured into the charge state, and when the smartcell 2 is placed/configured into a by-pass state, electric current can, as indicated by the bolded arrows of FIG. 9, flow: from the positive terminal 702; to an input line of the smartcell 1; across the voltage source of the smartcell 1 in a positive-to-negative direction, thereby charging/replenishing the smartcell 1; to the output line of the smartcell 1; to the input line of the smartcell 2; to the output line of the smartcell 2 without crossing the voltage source of the smartcell 2, thereby leaving the voltage source of the smartcell 2 unaffected; to the input line of the smartcell 3; across the voltage source of the smartcell 3 in a positive-to-negative direction, thereby charging/replenishing the smartcell 3; to the output line of the smartcell 3; . . . ; to the input line of the smartcell n; across the voltage source of the smartcell n in a positive-to-negative direction, thereby charging/replenishing the smartcell n; to the output line of the smartcell n; and finally to the negative terminal 704. In such configuration, the total, overall, and/or equivalent voltage of the battery 104 can be equal to the sum of all of the individual cell-wise voltages of those smartcells that are in charge states. In other words, the total, overall, and/or equivalent voltage of the battery 104 can be equal to the sum of all of the individual cell-wise voltages of the set of smartcells 106, minus the individual cell-wise voltage of the smartcell 2 (e.g., of the smartcell that is in a by-pass state).

Figure 10:
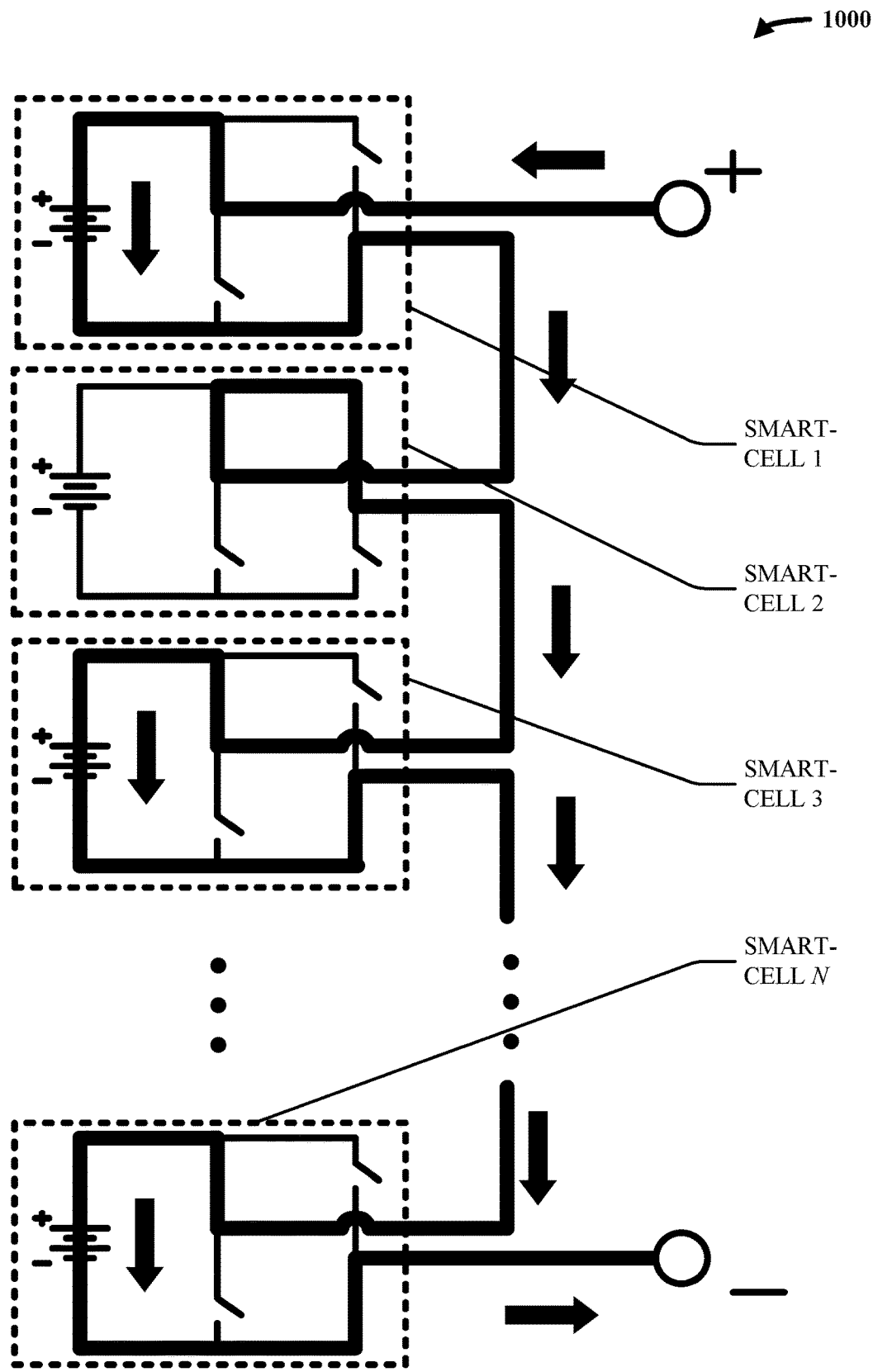
FIG. 10 illustrates a circuit diagram of an example, non-limiting battery that includes a set of battery cells which exhibit smartcell architectures, where one or more of such battery cells is configured to an alternative by-pass state, and where the remainder of such battery cells are configured to charge states, in accordance with one or more embodiments described herein.

FIG. 10 illustrates a circuit diagram 1000 of an example, non-limiting battery that includes a set of battery cells which exhibit smartcell architectures, where one or more of such battery cells is configured to an alternative by-pass state, and where the remainder of such battery cells are configured to charge states, in accordance with one or more embodiments described herein.

Without loss of generality, suppose that the smartcell 2 is placed into an alternative by-pass state. As shown, when each of the set of smartcells 106, except the smartcell 2, is placed and/or configured into the charge state, and when the smartcell 2 is placed/configured into an alternative by-pass state, electric current can, as indicated by the bolded arrows of FIG. 10, flow: from the positive terminal 702; to an input line of the smartcell 1; across the voltage source of the smartcell 1 in a positive-to-negative direction, thereby charging/replenishing the smartcell 1; to the output line of the smartcell 1; to the input line of the smartcell 2; to the output line of the smartcell 2 without crossing the voltage source of the smartcell 2, thereby leaving the voltage source of the smartcell 2 unaffected; to the input line of the smartcell 3; across the voltage source of the smartcell 3 in a positive-to-negative direction, thereby charging/replenishing the smartcell 3; to the output line of the smartcell 3; . . . ; to the input line of the smartcell n; across the voltage source of the smartcell n in a positive-to-negative direction, thereby charging/replenishing the smartcell n; to the output line of the smartcell n; and finally to the negative terminal 704. In such configuration, the total, overall, and/or equivalent voltage of the battery 104 can be equal to the sum of all of the individual cell-wise voltages of those smartcells that are in charge states. In other words, the total, overall, and/or equivalent voltage of the battery 104 can be equal to the sum of all of the individual cell-wise voltages of the set of smartcells 106, minus the individual cell-wise voltage of the smartcell 2 (e.g., of the smartcell that is in an alternative by-pass state).

Figure 11:
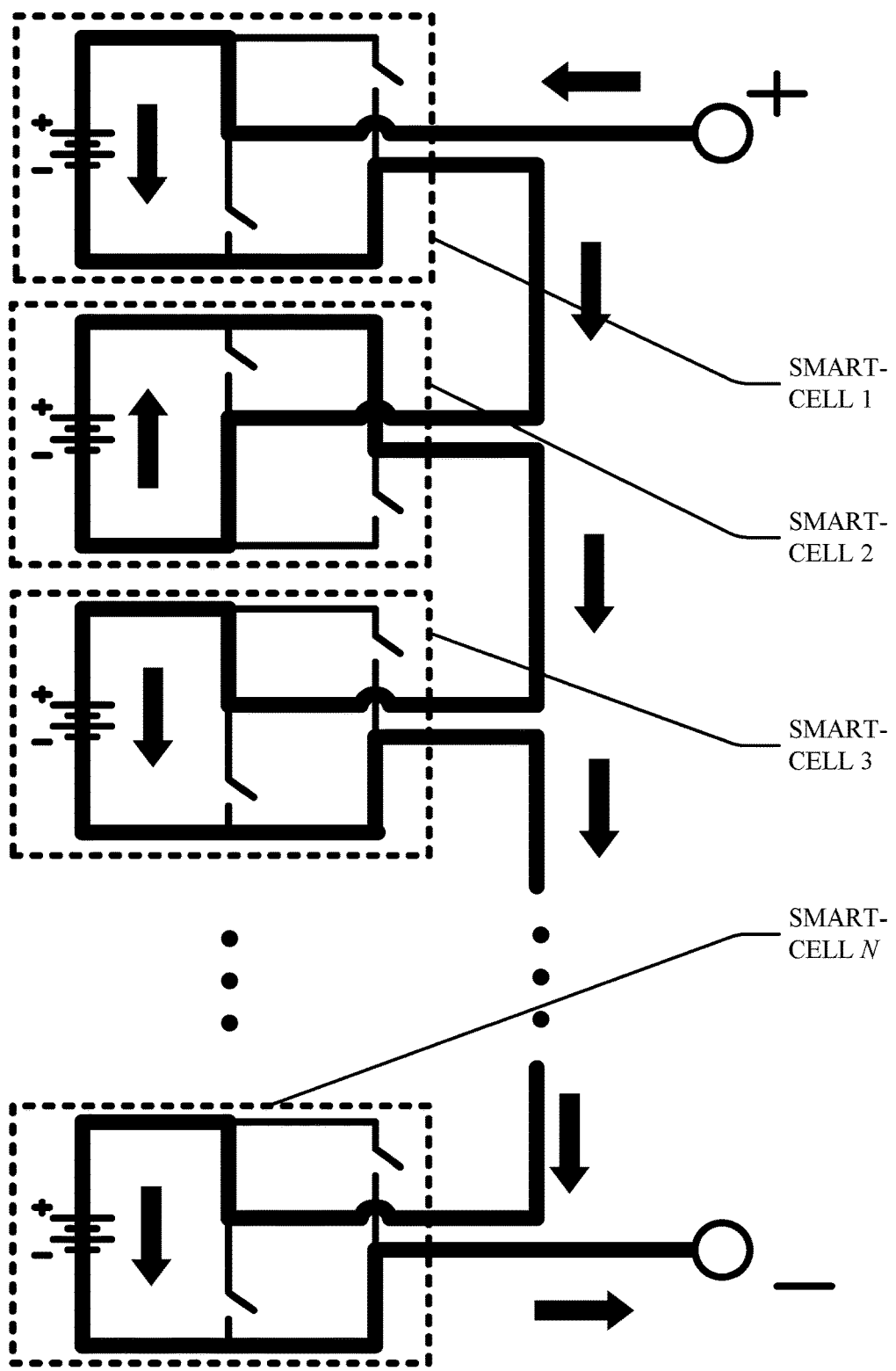
FIG. 11 illustrates a circuit diagram of an example, non-limiting battery that includes a set of battery cells which exhibit smartcell architectures, where one or more of such battery cells is configured to a discharge state, and where the remainder of such battery cells are configured to charge states, in accordance with one or more embodiments described herein.

FIG. 11 illustrates a circuit diagram 1100 of an example, non-limiting battery that includes a set of battery cells which exhibit smartcell architectures, where one or more of such battery cells is configured to a discharge state, and where the remainder of such battery cells are configured to charge states, in accordance with one or more embodiments described herein.

Without loss of generality, suppose that the smartcell 2 is placed into a discharge state. As shown, when each of the set of smartcells 106, except the smartcell 2, is placed and/or configured into the charge state, and when the smartcell 2 is placed/configured into the discharge state, electric current can, as indicated by the bolded arrows of FIG. 11, flow: from the positive terminal 702; to an input line of the smartcell 1; across the voltage source of the smartcell 1 in a positive-to-negative direction, thereby charging/replenishing the smartcell 1; to the output line of the smartcell 1; to the input line of the smartcell 2; across the voltage source of the smartcell 2 in a negative-to-positive direction, thereby discharging/depleting the smartcell 2; to the output line of the smartcell 2; to the input line of the smartcell 3; across the voltage source of the smartcell 3 in a positive-to-negative direction, thereby charging/replenishing the smartcell 3; to the output line of the smartcell 3; . . . ; to the input line of the smartcell n; across the voltage source of the smartcell n in a positive-to-negative direction, thereby charging/replenishing the smartcell n; to the output line of the smartcell n; and finally to the negative terminal 704. In such configuration, the total, overall, and/or equivalent voltage of the battery 104 can be equal to the sum of all of the individual cell-wise voltages of those smartcells that are in charge states, minus/less the sum of all of the individual cell-wise voltages of those smartcells that are in discharge states. In other words, the total, overall, and/or equivalent voltage of the battery 104 can be equal to the sum of all of the individual cell-wise voltages of the set of smartcells 106, minus twice the individual cell-wise voltage of the smartcell 2 (e.g., of the smartcell that is in the discharge state).

Although FIGS. 9-10 illustrate only a single smartcell being placed into a by-pass state, and/or although FIG. 11 illustrates only a single smartcell being placed into the discharge state, these are mere non-limiting examples for ease of illustration. In various aspects, any suitable number of the set of smartcells can be placed into the charge state, any suitable number of the set of smartcells can be placed into a by-pass state, and/or any suitable number of the set of smartcells can be placed into the discharge state. In such case, the total, overall, and/or equivalent voltage of the battery 104 can be equal to: the sum of the individual cell-wise voltages of those smartcells that are in charge states; minus the sum of the individual cell-wise voltages of those smartcells that are in discharge states. Put differently, the total, overall, and/or equivalent voltage of the battery 104 can be equal to: the sum of the individual cell-wise voltages of all of the set of smartcells 106; minus the sum of the individual cell-wise voltages of those smartcells that are placed into a by-pass state; and further minus twice the sum of the individual cell-wise voltages of those smartcells that are placed into the discharge state.

Therefore, as FIGS. 8-11 show, the total, overall, and/or equivalent voltage of the battery 104 can be controllably modified, manipulated, changed, and/or reduced in real-time, by controllably configuring the various ones of the set of smartcells 106 into charge states, discharge states, and/or by-pass states.

Figure 12:
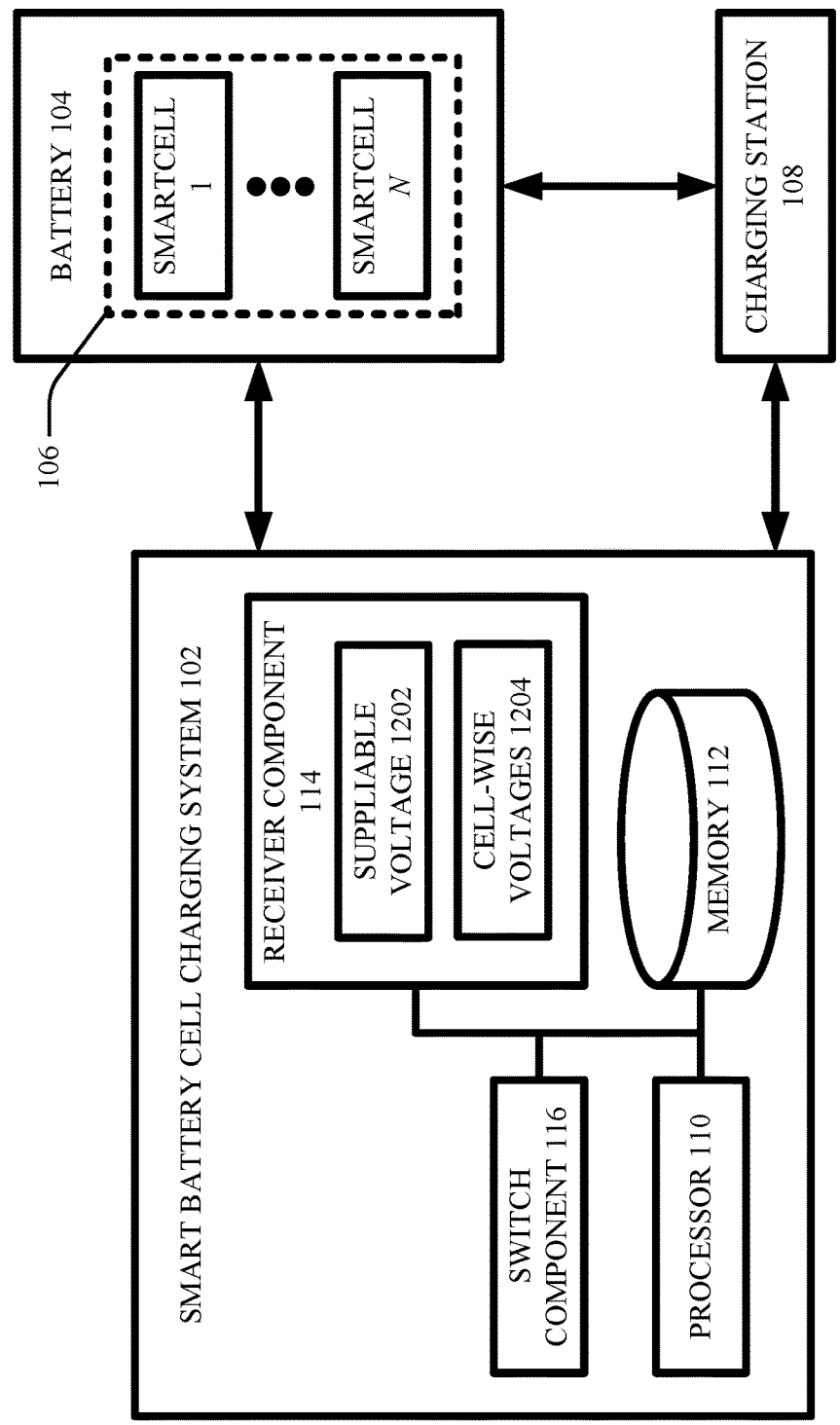
FIG. 12 illustrates a block diagram of an example, non-limiting system including a suppliable voltage and a set of battery cell voltages that facilitates smartcell battery architectures and methodologies in accordance with one or more embodiments described herein.

FIG. 12 illustrates a block diagram of an example, non-limiting system 1200 including a suppliable voltage and a set of battery cell voltages that can facilitate smartcell battery architectures and methodologies in accordance with one or more embodiments described herein. As shown, the system 1200 can, in some cases, comprise the same components as the system 100, and can further comprise a suppliable voltage 1202 and/or a set of cell-wise voltages 1204.

In various embodiments, the receiver component 114 of the smart battery cell charging system 102 can electronically measure, electronically receive, electronically identify, and/or otherwise electronically access the suppliable voltage 1202. In some instances, the receiver component 114 can electronically obtain the suppliable voltage 1202 from any suitable database (not shown) as desired. In other instances, the receiver component 114 can electronically obtain the suppliable voltage 1202 by electronically communicating with the charging station 108. In any case, the suppliable voltage 1202 can be any suitable scalar (and/or vector, matrix, and/or tensor, in some cases) that indicates and/or conveys how much voltage the charging station 108 is capable of supplying to the battery 104.

In various aspects, the receiver component 114 can further electronically measure, electronically receive, electronically identify, and/or otherwise electronically access the set of cell-wise voltages 1204. In some instances, the receiver component 114 can electronically obtain the set of cell-wise voltages 1204 from any suitable database (not shown) as desired. In other instances, the receiver component 114 can electronically obtain the set of cell-wise voltages 1204 by electronically communicating with the battery 104. In any case, the set of cell-wise voltages 1204 can be a set of scalars (and/or a set of vectors, matrices, and/or tensors, in some cases) that indicate and/or convey how much remaining voltage each of the set of smartcells 106 presently has (e.g., in real-time). Because the set of smartcells 106 can include n smartcells, the set of cell-wise voltages 1204 can include n voltage values: a cell-wise voltage 1 to a cell-wise voltage n. In such case, the cell-wise voltage 1 can indicate/convey how much remaining voltage the smartcell 1 presently has, and the cell-wise voltage n can indicate/convey how much remaining voltage the smartcell n presently has.

Figure 13:
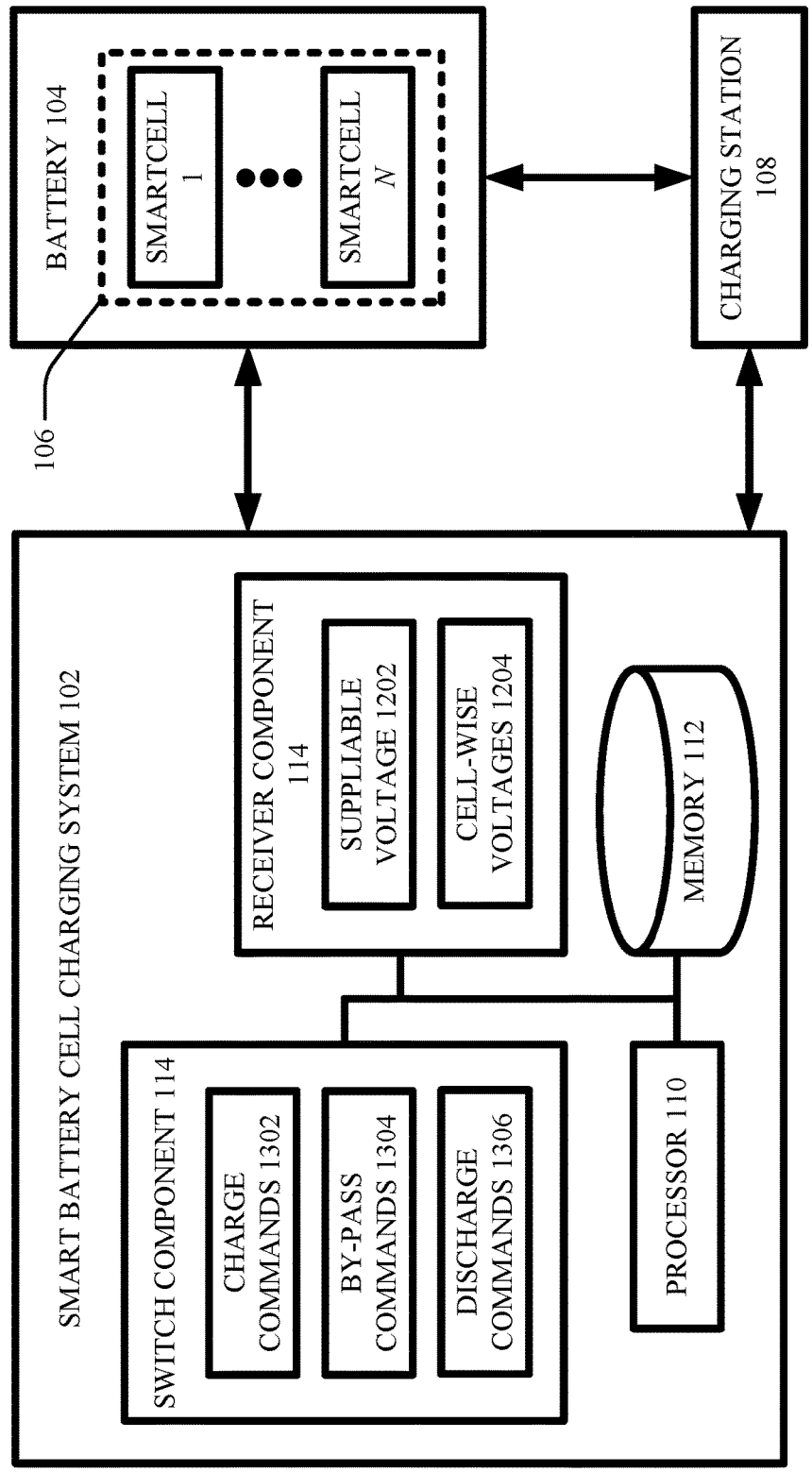
FIG. 13 illustrates a block diagram of an example, non-limiting system including a set of charge commands, a set of by-pass commands, and a set of discharge commands that facilitates smartcell battery architectures and methodologies in accordance with one or more embodiments described herein.

FIG. 13 illustrates a block diagram of an example, non-limiting system 1300 including a set of charge commands, a set of by-pass commands, and/or a set of discharge commands that can facilitate smartcell battery architectures and methodologies in accordance with one or more embodiments described herein. As shown, the system 1300 can, in some cases, comprise the same components as the system 1200, and can further comprise a set of charge commands 1302, a set of by-pass commands 1304, and/or a set of discharge commands 1306.

In various embodiments, the set of charge commands 1302 can include any suitable number of charge commands. In various aspects, a charge command can be any suitable electronic instruction that can cause a respectively corresponding one of the set of smartcells 106 to be configured into the charge state.

Likewise, in various instances, the set of by-pass commands 1304 can include any suitable number of by-pass commands. In various cases, a by-pass command can be any suitable electronic instruction that can cause a respectively corresponding one of the set of smartcells 106 to be configured into a by-pass state (or an alternative by-pass state).

Similarly, in various aspects, the set of discharge commands 1306 can include any suitable number of discharge commands. In various instances, a discharge command can be any suitable electronic instruction that can cause a respectively corresponding one of the set of smartcells 106 to be configured into the discharge state.

In various aspects, the switch component 116 can electronically generate the set of charge commands 1302, the set of by-pass commands 1304, and/or the set of discharge commands 1306, based on the suppliable voltage 1202 and/or based on the set of cell-wise voltages 1204. For example, in some cases, if the suppliable voltage 1202 is greater than or equal to the sum of the set of cell-wise voltages 1204, then it can be inferred that the charging station 108 possesses enough voltage to charge all of the set of smartcells 106 at the same time. In such case, the switch component 116 can generate n charge commands, 0 by-pass commands, and/or 0 discharge commands, thereby causing all of the set of smartcells 106 to be placed in the charge state. The switch component 116 can then electronically instruct/command the charging station 108 to begin charging (e.g., for any suitable amount of time) the battery 104.

As another example, in some cases, if the suppliable voltage 1202 is greater than or equal to the sum of the set of cell-wise voltages 1204, then it can be inferred that the charging station 108 possesses enough voltage to charge all of the set of smartcells 106 at the same time. However, it can nevertheless be the case that m of the set of smartcells 106 are already fully-charged, for any suitable positive integer m where m<n. In such case, the switch component 116 can generate m by-pass commands for those m smartcells that are already fully-charged, and the switch component 116 can generate n−m charge commands for the rest of the set of smartcells 106. This can cause the m smartcells that are already fully-charged to be placed in a by-pass state, and this can further cause the remaining n−m smartcells to be placed in the charge state. The switch component 116 can then electronically instruct/command the charging station 108 to begin charging (e.g., for any suitable amount of time) the battery 104.

As yet another example, in some cases, if the suppliable voltage 1202 is less than the sum of the set of cell-wise voltages 1204, then it can be inferred that the charging station 108 does not possess enough voltage to charge all of the set of smartcells 106 at the same time. In such case, the switch component 116 can electronically generate any suitable number of charge commands, any suitable number of by-pass commands, and/or any suitable number of discharge commands, such that the suppliable voltage 1202 is greater than or equal to: the sum of the cell-wise voltages of those smartcells that are in the charge state; minus the sum of the cell-wise voltages of those smartcells that are in the discharge state. At such point, the switch component 116 can then electronically instruct/command the charging station 108 to begin charging (e.g., for any suitable amount of time) the battery 104. Note that such charging can be accomplished without relying upon a DC-DC booster.

Furthermore, note that, when the suppliable voltage 1202 is less than the sum of the set of cell-wise voltages 1204, any suitable order of charging priority can be implemented with respect to the set of smartcells 106. As a non-limiting example, charging priority can be given to those smartcells that presently have the lowest level of voltage. In such case, the lowest-voltage smartcells can be configured into the charge state, intermediate-voltage smartcells can be configured into by-pass states, and/or the highest-voltage smartcells can be configured into the discharge state. As another non-limiting example, charging priority can be given to all smartcells that fall below any suitable predetermined voltage threshold. For instance, a threshold can be equal to and/or otherwise based on the quotient obtained by dividing the suppliable voltage 1202 by n. In such case, all smartcells that have a present voltage level that is at or below such threshold can be placed into the charge state, and the remaining smartcells can be placed into the discharge state or a by-pass state. Any other suitable charging priority hierarchy can be implemented as desired.

Figure 14:
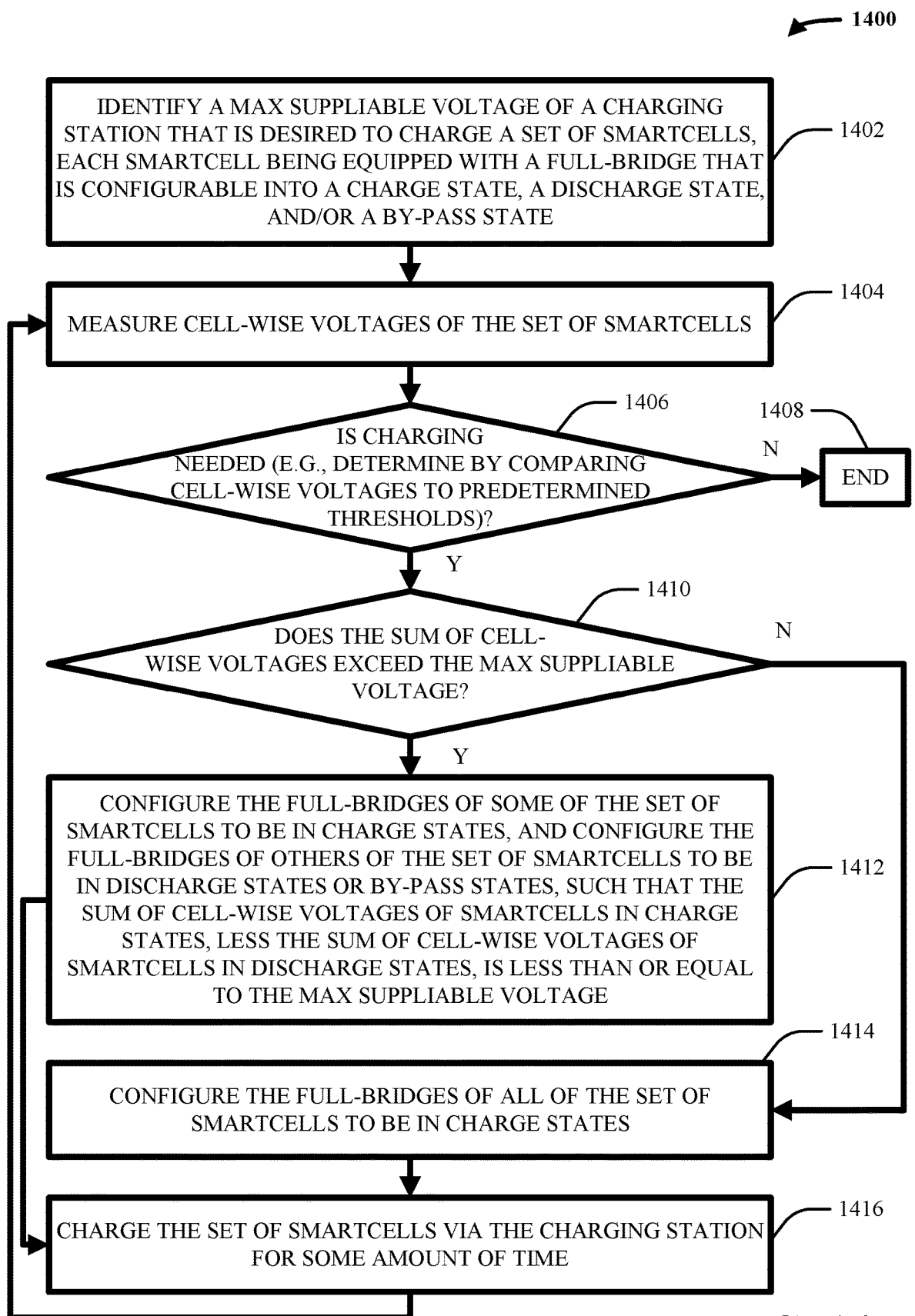
FIGS. 14-16 illustrate flow diagrams of example, non-limiting processes that facilitate smartcell battery architectures and methodologies in accordance with one or more embodiments described herein.
Figure 15:
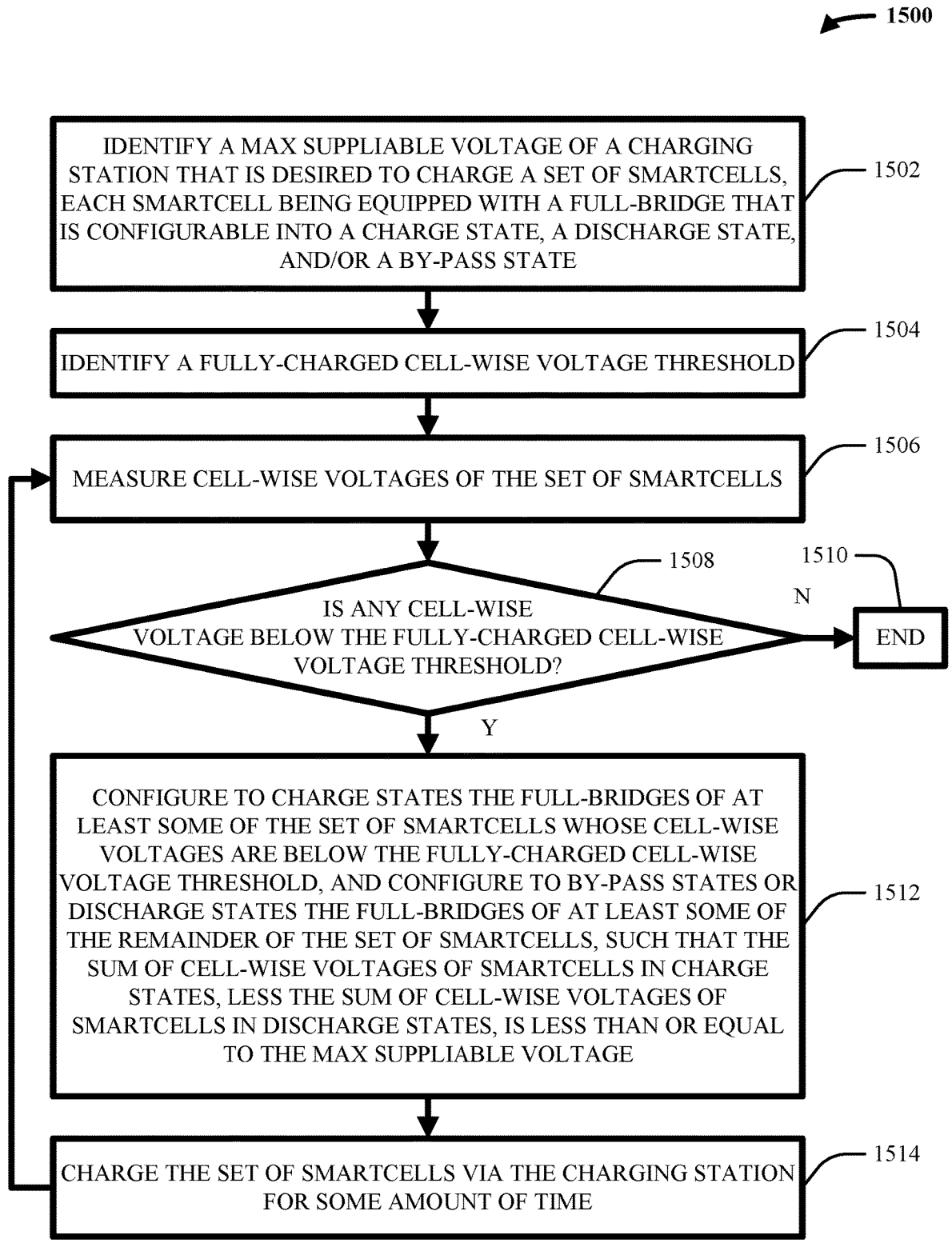
Figure 16:
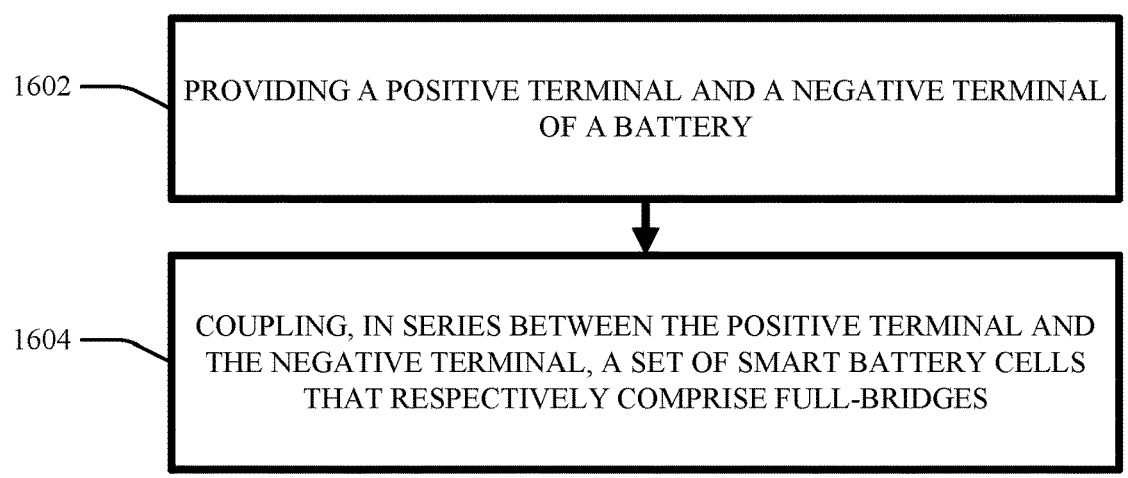

FIGS. 14-16 illustrate flow diagrams of example, non-limiting processes 1400, 1500, and/or 1600 that can facilitate smartcell battery architectures and methodologies in accordance with one or more embodiments described herein. Various of these processes can be facilitated by the smart battery cell charging system 102.

First, consider FIG. 14. In various embodiments, act 1402 can include identifying, by a device (e.g., via receiver component 114) operatively coupled to a processor, a max suppliable voltage (e.g., 1202) of a charging station (e.g., 108) that is desired to charge a set of smartcells (e.g., 106). In various cases, each smartcell can be equipped with a full-bridge (e.g., 206) that is configurable into a charge state (e.g., as shown in FIG. 3), a discharge state (e.g., as shown in FIG. 4), and/or a by-pass state (e.g., as shown in FIGS. 5-6).

In various aspects, act 1404 can include measuring, by the device (e.g., via receiver component 114), cell-wise voltages (e.g., 1204) of the set of smartcells.

In various instances, act 1406 can include determining, by the device (e.g., via switch component 116), whether charging is needed for the set of smartcells. In various cases, this determination can be facilitated by comparing each of the cell-wise voltages to any suitable predetermined voltage threshold as desired. If charging is not needed (e.g., if all of the smartcells are already fully-charged or otherwise above some voltage threshold), then the process 1400 can proceed to act 1408 where it can end. On the other hand, if charging is needed (e.g., if not all of the smartcells are already fully-charged or otherwise above some voltage threshold), then the process 1400 can proceed to act 1410.

In various aspects, act 1410 can include determining, by the device (e.g., via switch component 116) whether the sum of cell-wise voltages exceeds the max suppliable voltage. If not, the process 1400 can proceed to act 1414. If so, the process 1400 can proceed to act 1412.

In various instances, act 1414 can include configuring, by the device (e.g., via switch component 116), the full-bridges of all of the set of smartcells to be in charge states. The process 1400 can then proceed to act 1416.

In various cases, act 1412 can include configuring, by the device (e.g., via switch component 116), the full-bridges of some of the set of smartcells to be in charge states, and configuring, by the device (e.g., via switch component 116), the full-bridges of others of the set of smartcells to be in discharge states or by-pass states, such that the sum of cell-wise voltages of those smartcells that are in charge states, less (e.g., minus) the sum of cell-wise voltages of those smartcells that are in discharge states, is less than or equal to the max suppliable voltage. The process 1400 can then proceed to act 1416.

In various aspects, act 1416 can include charging, by the device (e.g., via switch component 116) the set of smartcells via the charging station for some amount of time (e.g., any suitable amount of time as desired). In various cases, the process 1400 can then proceed back to act 1404. As shown, act 1404-1416 can loop until charging is no longer needed.

Now, consider FIG. 15. In various embodiments, act 1502 can include identifying, by a device (e.g., via receiver component 114) operatively coupled to a processor, a max suppliable voltage (e.g., 1202) of a charging station (e.g., 108) that is desired to charge a set of smartcells (e.g., 106). In various cases, each smartcell can be equipped with a full-bridge (e.g., 206) that is configurable into a charge state (e.g., as shown in FIG. 3), a discharge state (e.g., as shown in FIG. 4), and/or a by-pass state (e.g., as shown in FIGS. 5-6).

In various aspects, act 1504 can include identifying, by the device (e.g., via receiver component 114), a fully-charge cell-wise voltage threshold. In various cases, such threshold can indicate and/or convey how much voltage an individual smartcell needs in order to be considered as a fully-charged smartcell. In various cases, the fully-charged cell-wise voltage threshold can have any suitable magnitude as desired.

In various instances, act 1506 can include measuring, by the device (e.g., via receiver component 114), cell-wise voltages (e.g., 1204) of the set of smartcells.

In various cases, act 1508 can include determining, by the device (e.g., via switch component 116), whether any cell-wise voltage is below (e.g., less than) the fully-charged cell-wise voltage threshold. If not, the process 1500 can proceed to act 1510 where it can end. On the other hand, if so, the process 1500 can proceed to act 1512.

In various aspects, act 1512 can include configuring, by the device (e.g., via switch component 116), to charge states the full-bridges of at least some of the set of smartcells whose cell-wise voltages are below the fully-charged cell-wise voltage threshold. Furthermore, act 1512 can include configuring, by the device (e.g., via switch component 116), to by-pass states and/or to discharge states the full-bridges of at least some of the remainder of the set of smartcells. In various cases, the result can be that the max suppliable voltage is greater than or equal to: the sum of cell-wise voltages of those smartcells that are in charge states, less (e.g., minus) the sum of cell-wise voltages of those smartcells that are in discharge states.

In various instances, act 1514 can include charging, by the device (e.g., via switch component 116), the set of smartcells via the charging station for some amount of time (e.g., any suitable length of time as desired). In various cases, the process 1500 can proceed back to act 1506. As shown, acts 1506-1514 can iterate until no cell-wise voltage is below the fully-charged cell-wise voltage threshold.

Lastly, consider FIG. 16. In various embodiments, act 1602 can include providing a positive terminal (e.g., 702) and/or a negative terminal (e.g., 704) of a battery (e.g., 104). In various aspects, act 1604 can include coupling, in series between the positive terminal and the negative terminal, a set of smart battery cells (e.g., 106) that respectively comprise full-bridges (e.g., 206).

Although not explicitly shown in FIG. 16, the full-bridges can have charge states, discharge states, and/or by-pass states.

Although not explicitly shown in FIG. 16, a first smart battery cell (e.g., 202) in the set of smart battery cells can comprise a first voltage source (e.g., 204) and a first full-bridge (e.g., 206). In various instances, the first full-bridge can comprise a first switch (e.g., 208), a second switch (e.g., 210), a third switch (e.g., 212), and/or a fourth switch (e.g., 214). In various cases, the first switch and the second switch can be coupled together in series, such that the first switch and the second switch are collectively in parallel with the first voltage source, and/or such that the first switch is on a positive side of the first voltage source and the second switch is on a negative side of the first voltage source. In various aspects, the third switch and the fourth switch can be coupled together in series, such that the third switch and the fourth switch are collectively in parallel with the first voltage source, and/or such that the third switch is on the positive side of the first voltage source and the fourth switch is on the negative side of the first voltage source. In various instances, a first wire (e.g., input line 216) from a preceding smart battery cell in the set of smart battery cells can be coupled in between the first switch and the second switch, and/or a second wire (e.g., output line 218) from a succeeding smart battery cell in the set of smart battery cells can be coupled in between the third switch and the fourth switch.

Although not explicitly shown in FIG. 16, the first full-bridge can be in a charge state when the first switch and the fourth switch are both closed and the second switch and the third switch are both open (e.g., as shown in FIG. 3).

Although not explicitly shown in FIG. 16, the first full-bridge can be in a discharge state when the second switch and the third switch are both closed and the first switch and the fourth switch are both open (e.g., as shown in FIG. 4).

Although not explicitly shown in FIG. 16, the first full-bridge can be in a by-pass state when the first switch and the third switch are both closed and the second switch and the fourth switch are both open (e.g., as shown in FIG. 6), or when the second switch and the fourth switch are both closed and the first switch and the third switch are both open (e.g., as shown in FIG. 5).

Although not explicitly shown in FIG. 16, full-bridges of various of the set of smart battery cells can be in charge states, and/or full-bridges of a remainder of the set of smart battery cells can be in by-pass states or discharge states. In such case, the set of smart battery cells can be chargeable by a charging source whose maximum suppliable voltage is less than a total sum of individual voltages of the set of smart battery cells.

Accordingly, various embodiments described herein include smartcell battery architectures and/or methodologies that can enable a low-voltage charging station to charge a high-voltage set of battery cells, without relying upon and/or requiring a DC-DC booster. Such smartcell battery architectures and/or methodologies are certainly concrete and tangible technical improvements in the field of battery cells.

Although the herein disclosure mainly describes various embodiments as applying to EV batteries, this is a mere non-limiting example for ease of explanation. In various aspects, various embodiments described herein can be applied to any suitable type of battery that is composed of a set of battery cells.

In various instances, machine learning algorithms and/or models can be implemented in any suitable way to facilitate any suitable aspects described herein (e.g., in some cases, the smart battery cell charging system 102 can utilize machine learning when performing its functionalities; in other cases, each smartcell can utilize machine learning to determine which state it should be in with respect to its neighboring smartcells). To facilitate some of the above-described machine learning aspects of various embodiments, consider the following discussion of artificial intelligence (AI). Various embodiments described herein can employ artificial intelligence to facilitate automating one or more features and/or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments. For ease of description and/or explanation, various portions of the herein disclosure utilize the term "each" when discussing various embodiments. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments, and it should be further understood that, in various other embodiments, it can be the case that such description applies to fewer than "each" of that particular object and/or component.

Figure 17:
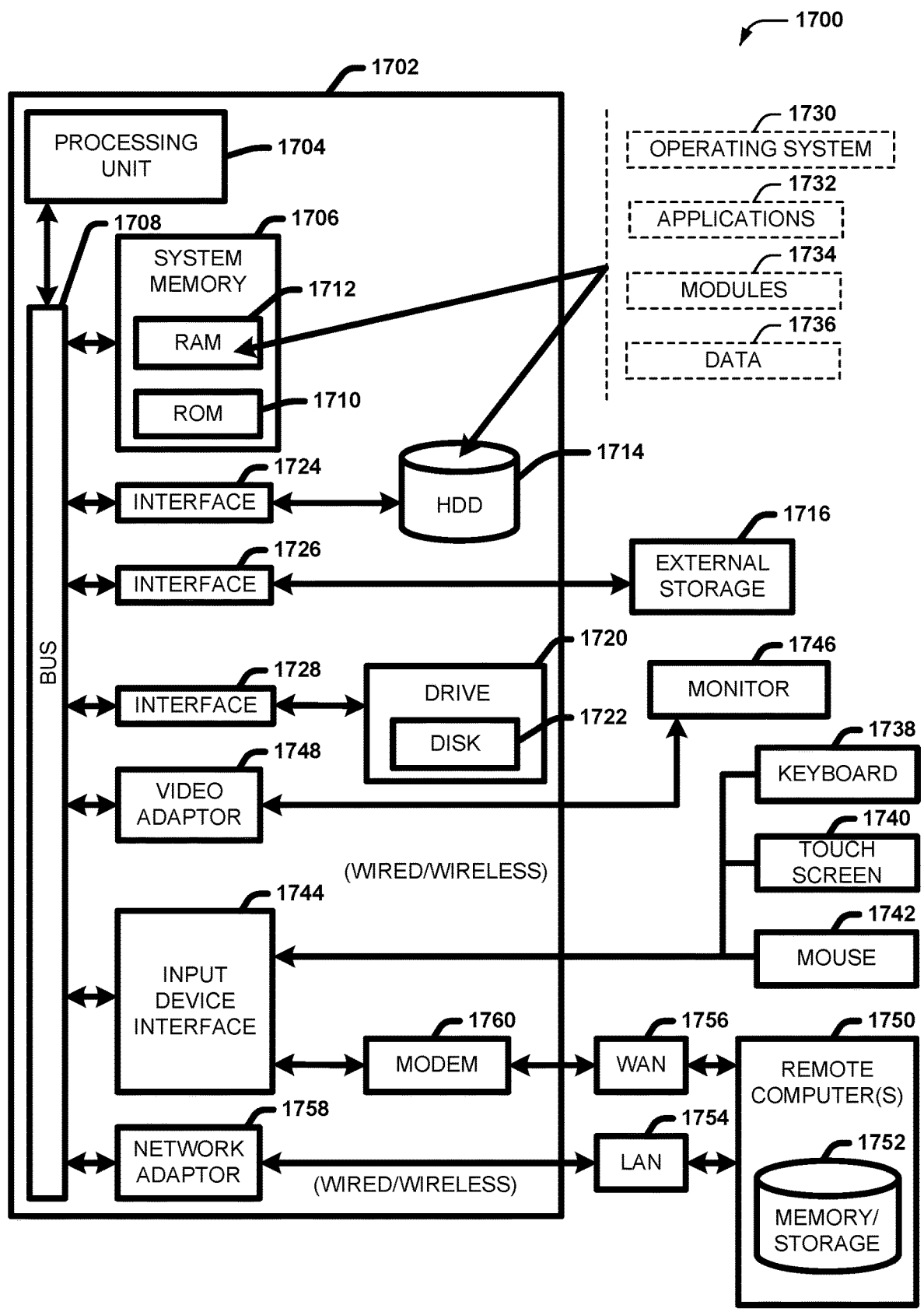
FIG. 17 illustrates a block diagram of an example, non-limiting operating environment in which one or more embodiments described herein can be facilitated.

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and a drive 1720, e.g., such as a solid state drive, an optical disk drive, which can read or write from a disk 1722, such as a CD-ROM disc, a DVD, a BD, etc. Alternatively, where a solid state drive is involved, disk 1722 would not be included, unless separate. While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714. The HDD 1714, external storage device(s) 1716 and drive 1720 can be connected to the system bus 1708 by an HDD interface 1724, an external storage interface 1726 and a drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enable with a security module, such as a trusted processing module (TPM). For instance with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above, such as but not limited to a network virtual machine providing one or more aspects of storage or processing of information. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
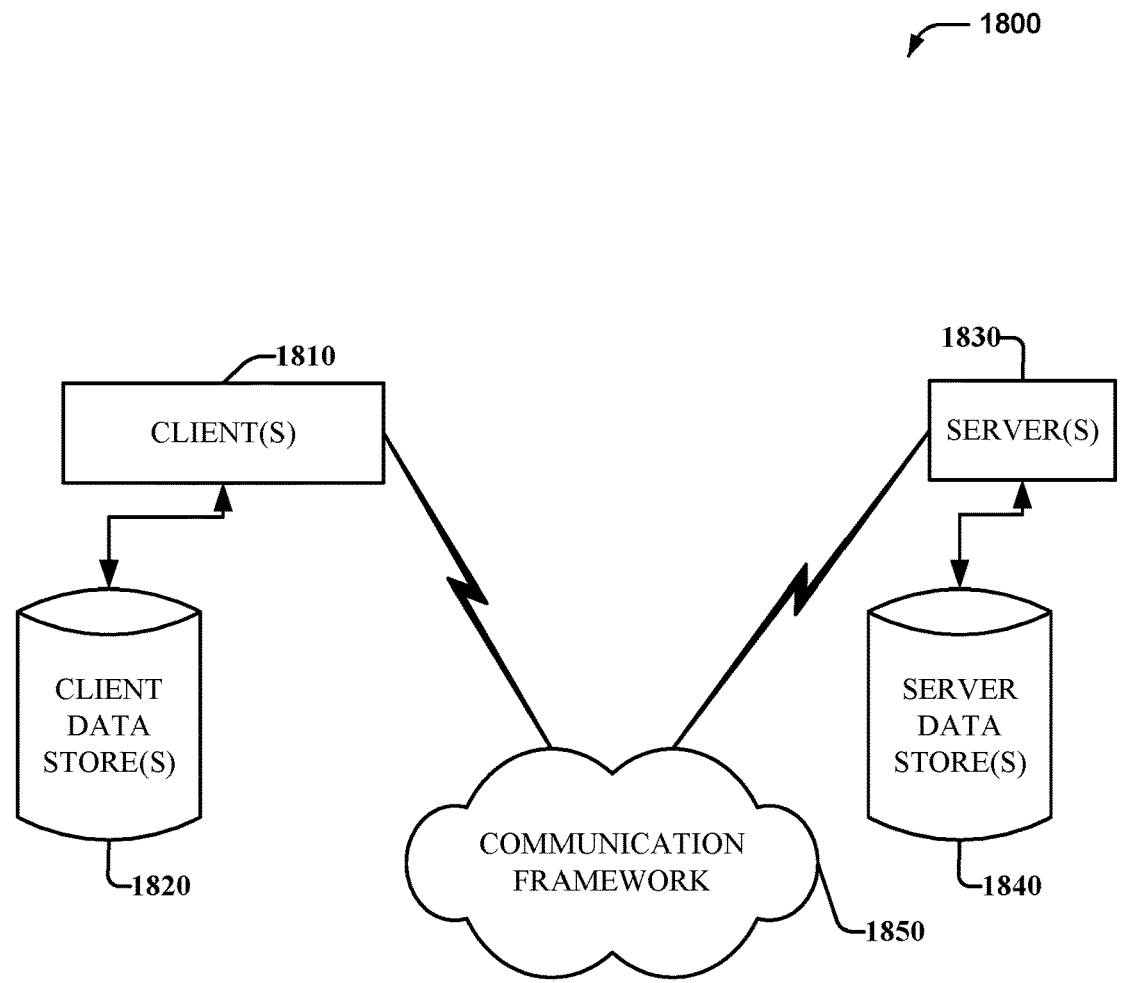
FIG. 18 illustrates an example networking environment operable to execute various implementations described herein.

FIG. 18 is a schematic block diagram of a sample computing environment 1800 with which the disclosed subject matter can interact. The sample computing environment 1800 includes one or more client(s) 1810. The client(s) 1810 can be hardware and/or software (e.g., threads, processes, computing devices). The sample computing environment 1800 also includes one or more server(s) 1830. The server(s) 1830 can also be hardware and/or software (e.g., threads, processes, computing devices). The servers 1830 can house threads to perform transformations by employing one or more embodiments as described herein, for example. One possible communication between a client 1810 and a server 1830 can be in the form of a data packet adapted to be transmitted between two or more computer processes. The sample computing environment 1800 includes a communication framework 1850 that can be employed to facilitate communications between the client(s) 1810 and the server(s) 1830. The client(s) 1810 are operably connected to one or more client data store(s) 1820 that can be employed to store information local to the client(s) 1810. Similarly, the server(s) 1830 are operably connected to one or more server data store(s) 1840 that can be employed to store information local to the servers 1830.

Various embodiments described herein may be a system, a method, an apparatus and/or a computer program product at any possible technical detail level of integration. The computer program product can include a computer readable storage medium (or media) having computer readable program instructions thereon for causing a processor to carry out aspects of various embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of various embodiments described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of various embodiments described herein.

Aspects of various embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further aspects of various embodiments described herein are provided by the subject matter of the following clauses:

1. A battery, comprising:
    a positive terminal and a negative terminal; and
    a set of smart battery cells that are serially coupled between the positive terminal and the negative terminal and that respectively comprise full-bridges.

2. The battery of any preceding clause, wherein the full-bridges have charge states, discharge states, and by-pass states.

3. The battery of any preceding clause, wherein a first smart battery cell in the set of smart battery cells comprises a first voltage source and a first full-bridge;
    wherein the first full-bridge comprises a first switch, a second switch, a third switch, and a fourth switch;
    wherein the first switch and the second switch are coupled together in series;
    wherein the first switch and the second switch are collectively in parallel with the first voltage source such that the first switch is on a positive side of the first voltage source and the second switch is on a negative side of the first voltage source;
    wherein the third switch and the fourth switch are coupled together in series;
    wherein the third switch and the fourth switch are collectively in parallel with the first voltage source such that the third switch is on the positive side of the first voltage source and the fourth switch is on the negative side of the first voltage source;
    wherein a first wire from a preceding smart battery cell in the set of smart battery cells is coupled in between the first switch and the second switch; and
    wherein a second wire from a succeeding smart battery cell in the set of smart battery cells is coupled in between the third switch and the fourth switch.

4. The battery of any preceding clause, wherein the first full-bridge is in a charge state when the first switch and the fourth switch are both closed and the second switch and the third switch are both open.

5. The battery of any preceding clause, wherein the first full-bridge is in a discharge state when the second switch and the third switch are both closed and the first switch and the fourth switch are both open.

6. The battery of any preceding clause, wherein the first full-bridge is in a by-pass state when the first switch and the third switch are both closed and the second switch and the fourth switch are both open, or when the second switch and the fourth switch are both closed and the first switch and the third switch are both open.

7. The battery of any preceding clause, wherein the first switch, the second switch, the third switch, and the fourth switch are metal-oxide-semiconductor field-effect transistors.

8. The battery of any preceding clause, wherein full-bridges of various of the set of smart battery cells are in charge states, and wherein full-bridges of a remainder of the set of smart battery cells are in by-pass states or discharge states, thereby causing the set of smart battery cells to be chargeable by a charging source whose maximum suppliable voltage is less than a sum of individual voltages of the set of smart battery cells.

9. The battery of clause 1 above with any combination and/or set of combinations of the batteries 2-8 above.

10. A method, comprising:
providing a positive terminal and a negative terminal of a battery; and
coupling, in series between the positive terminal and the negative terminal, a set of smart battery cells that respectively comprise full-bridges.

11. The method of any preceding clause, wherein the full-bridges have charge states, discharge states, and by-pass states.

12. The method of any preceding clause, wherein a first smart battery cell in the set of smart battery cells comprises a first voltage source and a first full-bridge;
wherein the first full-bridge comprises a first switch, a second switch, a third switch, and a fourth switch;
wherein the first switch and the second switch are coupled together in series;
wherein the first switch and the second switch are collectively in parallel with the first voltage source such that the first switch is on a positive side of the first voltage source and the second switch is on a negative side of the first voltage source;
wherein the third switch and the fourth switch are coupled together in series;
wherein the third switch and the fourth switch are collectively in parallel with the first voltage source such that the third switch is on the positive side of the first voltage source and the fourth switch is on the negative side of the first voltage source;
wherein a first wire from a preceding smart battery cell in the set of smart battery cells is coupled in between the first switch and the second switch; and
wherein a second wire from a succeeding smart battery cell in the set of smart battery cells is coupled in between the third switch and the fourth switch.

13. The method of any preceding clause, wherein the first full-bridge is in a charge state when the first switch and the fourth switch are both closed and the second switch and the third switch are both open.

14. The method of any preceding clause, wherein the first full-bridge is in a discharge state when the second switch and the third switch are both closed and the first switch and the fourth switch are both open.

15. The method of any preceding clause, wherein the first full-bridge is in a by-pass state when the first switch and the third switch are both closed and the second switch and the fourth switch are both open, or when the second switch and the fourth switch are both closed and the first switch and the third switch are both open.

16. The method of any preceding clause, wherein the first switch, the second switch, the third switch, and the fourth switch are metal-oxide-semiconductor field-effect transistors.

17. The method of any preceding clause, wherein full-bridges of various of the set of smart battery cells are in charge states, and wherein full-bridges of a remainder of the set of smart battery cells are in by-pass states or discharge states, thereby causing the set of smart battery cells to be chargeable by a charging source whose maximum suppliable voltage is less than a sum of individual voltages of the set of smart battery cells.

18. The method of clause 10 above with any combination and/or set of combinations of the methods 11-17 above.

19. A battery, comprising:
a set of smart battery cells that respectively comprise full-bridges, wherein the full-bridges are independently configurable into charge states, discharge states, and by-pass states.

20. The battery of any preceding clause, wherein the set of smart battery cells are chargeable by a charging station whose maximum suppliable voltage is less than a sum of individual voltages of the set of smart battery cells, when full-bridges of some of the set of smart battery cells are in charge states and full-bridges of others of the set of smart battery cells are in by-pass states.

21. The battery of any preceding clause, wherein the set of smart battery cells are chargeable by a charging station whose maximum suppliable voltage is less than a sum of individual voltages of the set of smart battery cells, when full-bridges of some of the set of smart battery cells are in charge states and full-bridges of others of the set of smart battery cells are in discharge states.

22. The battery of any preceding clause, wherein a first smart battery cell in the set of smart battery cells comprises a first voltage source and a first full-bridge;
wherein the first full-bridge comprises a first pair of series switches and a second pair of series switches;
wherein both the first pair of series switches and the second pair of series switches are in parallel with the first voltage source;
wherein a first wire from a first adjacent smart battery cell in the set of smart battery cells is coupled in between the first pair of series switches;
and wherein a second wire from a second adjacent smart battery cell in the set of smart battery cells is coupled in between the second pair of series switches.

23. The battery of clause 19 above with any combination and/or set of combinations of the batteries 20-22 above.

What is claimed is:
1. A method, comprising:
providing a positive terminal and a negative terminal of a battery;
coupling, in series between the positive terminal and the negative terminal, a set of smart battery cells that respectively comprise full-bridges; and in response to detecting that the battery is connected to a charging station:
  determining, by a processor, a maximum voltage supply of the charging station, and
  in response to determining that the maximum voltage supply of the charging station is less than a total voltage supply of the battery:
    configuring, by the processor, respective full-bridges of a subset of the set of smart battery cells to place the subset of the set of smart battery cells in a charge state, wherein the subset of the set of smart battery cells comprises a voltage supply that is substantially equal to the maximum voltage supply of the charging station, and
    configuring, by the processor, respective full-bridges of remaining smart battery cells of the set of smart battery cells that are not in the subset to place the remaining smart battery cells respectively in a bypass state or a discharge state.

2. The method of claim 1, wherein respective smart battery cells in the set of smart battery cells comprises respective voltage sources and the respective full-bridges; and
for each smart battery cell:
  wherein the full-bridge of the smart battery cell comprises a first switch, a second switch, a third switch, and a fourth switch;
  wherein the first switch and the second switch are coupled together in series;
  wherein the first switch and the second switch are collectively in parallel with the voltage source of the smart battery cell such that the first switch is on a positive side of the voltage source and the second switch is on a negative side of the voltage source;
  wherein the third switch and the fourth switch are coupled together in series;
  wherein the third switch and the fourth switch are collectively in parallel with the voltage source such that the third switch is on the positive side of the voltage source and the fourth switch is on the negative side of the voltage source;
  wherein a second wire from a succeeding smart battery cell in a sequential order of the set of smart battery cells is coupled in between the third switch and the fourth switch; and
  wherein a first wire from a preceding smart battery cell in the sequential order of the set of smart battery cells is coupled in between the first switch and the second switch if the smart battery cell is not a first smart battery cell in the sequential order.

3. The method of claim 2, wherein the first switch, the second switch, the third switch, and the fourth switch are metal-oxide-semiconductor field-effect transistors.

4. The method of claim 2, wherein the first wire is from the positive terminal and is coupled in between the first switch and the second switch if the smart battery cell is the first smart battery cell in the sequential order.

5. The method of claim 4, wherein the full-bridge is in the charge state when the first switch and the fourth switch are both closed and the second switch and the third switch are both open.

6. The method of claim 4, wherein the full-bridge is in the discharge state when the second switch and the third switch are both closed and the first switch and the fourth switch are both open.

7. The method of claim 4, wherein the full-bridge is in the by-pass state when the first switch and the third switch are both closed and the second switch and the fourth switch are both open, or when the second switch and the fourth switch are both closed and the first switch and the third switch are both open.

8. A battery, comprising:
a positive terminal and a negative terminal; and
  a set of smart battery cells that are coupled in series between the positive terminal and the negative terminal, wherein the set of smart battery cells respectively comprise full-bridges;
a processor; and
a memory operatively coupled to the processor, the memory having stored therein computer executable components comprising:
a switch component that, in response to detecting that the battery is connected to a charging station:
determines a maximum voltage supply of the charging station, and
in response to determining that the maximum voltage supply of the charging station is less than a total voltage supply of the battery:
configures respective full-bridges of a subset of the set of smart battery cells to place the subset of the set of smart battery cells in a charge state, wherein the subset of the set of smart battery cells comprises a voltage supply that is substantially equal to the maximum voltage supply of the charging station, and
configures respective full-bridges of remaining smart battery cells of the set of smart battery cells that are not in the subset to place the remaining smart battery cells respectively in a bypass state or a discharge state.

9. The battery of claim 8, wherein respective smart battery cells in the set of smart battery cells comprises respective voltage sources and the respective full-bridges; and
for each smart battery cell:
  wherein the full-bridge of the smart battery cell comprises a first switch, a second switch, a third switch, and a fourth switch;
  wherein the first switch and the second switch are coupled together in series;
  wherein the first switch and the second switch are collectively in parallel with the voltage source of the smart battery cell such that the first switch is on a positive side of the voltage source and the second switch is on a negative side of the voltage source;
  wherein the third switch and the fourth switch are coupled together in series;
  wherein the third switch and the fourth switch are collectively in parallel with the voltage source such that the third switch is on the positive side of the voltage source and the fourth switch is on the negative side of the voltage source;
  wherein a second wire from a succeeding smart battery cell in a sequential order of the set of smart battery cells is coupled in between the third switch and the fourth switch; and
  wherein a first wire from a preceding smart battery cell in the sequential order of the set of smart battery cells is coupled in between the first switch and the second switch if the smart battery cell is not a first smart battery cell in the sequential order.

10. The battery of claim 9, wherein the first wire is from the positive terminal and is coupled in between the first switch and the second switch if the smart battery cell is the first smart battery cell in the sequential order.

11. The battery of claim 10, wherein the full-bridge is in the charge state when the first switch and the fourth switch are both closed and the second switch and the third switch are both open.

12. The battery of claim 10, wherein the full-bridge is in the discharge state when the second switch and the third switch are both closed and the first switch and the fourth switch are both open.

13. The battery of claim 10, wherein the full-bridge is in the by-pass state when the first switch and the third switch are both closed and the second switch and the fourth switch are both open, or when the second switch and the fourth switch are both closed and the first switch and the third switch are both open.

14. A system, comprising:
a battery, comprising:
a positive terminal and a negative terminal; and
a set of smart battery cells that are serially coupled between the positive terminal and the negative terminal, wherein the set of smart battery cells respectively comprise full-bridges;
a processor; and
a memory operatively coupled to the processor, the memory having stored therein computer executable components comprising:
a switch component that, in response to detecting that the battery is connected to a charging station:
determines a maximum voltage supply of the charging station, and
in response to determining that the maximum voltage supply of the charging station is less than a total voltage supply of the battery:
configures respective full-bridges of a subset of the set of smart battery cells to place the subset of the set of smart battery cells in a charge state, wherein the subset of the set of smart battery cells comprises a voltage supply that is substantially equal to the maximum voltage supply of the charging station, and
configures respective full-bridges of remaining smart battery cells of the set of smart battery cells that are not in the subset to place the remaining smart battery cells respectively in a bypass state or a discharge state.

15. The system of claim 14, wherein respective smart battery cells in the set of smart battery cells comprises respective voltage sources and the respective full-bridges; and for each smart battery cell:
wherein the full-bridge of the smart battery cell comprises a first switch, a second switch, a third switch, and a fourth switch;
wherein the first switch and the second switch are coupled together in series;
wherein the first switch and the second switch are collectively in parallel with the voltage source of the smart battery cell such that the first switch is on a positive side of the voltage source and the second switch is on a negative side of the voltage source;
wherein the third switch and the fourth switch are coupled together in series;
wherein the third switch and the fourth switch are collectively in parallel with the voltage source such that the third switch is on the positive side of the voltage source and the fourth switch is on the negative side of the voltage source;
wherein a second wire from a succeeding smart battery cell in a sequential order of the set of smart battery cells is coupled in between the third switch and the fourth switch; and
wherein a first wire from a preceding smart battery cell in the sequential order of the set of smart battery cells is coupled in between the first switch and the second switch if the smart battery cell is not a first smart battery cell in the sequential order.

16. The system of claim 15, wherein the first switch, the second switch, the third switch, and the fourth switch are metal-oxide-semiconductor field-effect transistors.

17. The system of claim 15, wherein the first wire is from the positive terminal and is coupled in between the first switch and the second switch if the smart battery cell is the first smart battery cell in the sequential order.

18. The system of claim 17, wherein the full-bridge is in the charge state when the first switch and the fourth switch are both closed and the second switch and the third switch are both open.

19. The system of claim 17, wherein the full-bridge is in the discharge state when the second switch and the third switch are both closed and the first switch and the fourth switch are both open.

20. The system of claim 17, wherein the full-bridge is in the by-pass state when the first switch and the third switch are both closed and the second switch and the fourth switch are both open, or when the second switch and the fourth switch are both closed and the first switch and the third switch are both open.

* * * * *